US012553271B2

(12) United States Patent
Boundy et al.

(10) Patent No.: US 12,553,271 B2
(45) Date of Patent: Feb. 17, 2026

(54) SYSTEMS AND DEVICES FOR MOTION CONTROL

(71) Applicant: Moshun, LLC, Oak Brook, IL (US)

(72) Inventors: Timothy John Boundy, Deer Park, IL (US); Richard Michael Lang, Howey In The Hills, FL (US)

(73) Assignee: MOSHUN, LLC, Oak Brook, IL (US)

( * ) Notice: Subject to any disclaimer, the term of this patent is extended or adjusted under 35 U.S.C. 154(b) by 38 days.

(21) Appl. No.: 18/188,852

(22) Filed: Mar. 23, 2023

(65) Prior Publication Data

US 2023/0304344 A1 Sep. 28, 2023

Related U.S. Application Data

(60) Provisional application No. 63/322,919, filed on Mar. 23, 2022.

(51) Int. Cl.
*E05F 3/20* (2006.01)
*E05D 3/02* (2006.01)
(Continued)

(52) U.S. Cl.
CPC .................. *E05F 3/20* (2013.01); *E05D 3/02* (2013.01); *E05F 1/1223* (2013.01); *E05F 3/04* (2013.01);
(Continued)

(58) Field of Classification Search
CPC ....... E05F 3/02; E05F 3/10; E05F 3/04; E05F 3/18; E05F 3/30; E05F 3/12; E05F 3/104;
(Continued)

(56) References Cited

U.S. PATENT DOCUMENTS 669,762 A 3/1901 Peregrine
1,041,223 A * 10/1912 Zuk ............................ E05F 3/20 16/49
(Continued)

FOREIGN PATENT DOCUMENTS

CN 107083886 8/2017
CN 107083886 A * 8/2017 ............... E05D 3/02
(Continued)

OTHER PUBLICATIONS

PCT, Invitation to Pay Aditional Fees and, where Applicable, Protest Fee, in Application PCT/US23/16082 (5 pages).
(Continued)

*Primary Examiner* — Jason W San
*Assistant Examiner* — Matthew J Sullivan
(74) *Attorney, Agent, or Firm* — McAndrews Held & Malloy, Ltd.

(57) ABSTRACT

Systems and devices to control rotational and/or arcuate motion are provided herein. In some examples, a hinge system is configured to replace a conventional door hinge and to control motion of the door. In some examples, a hinge system is configured to replace a conventional door hinge and to control motion of the door by employing a shear thickening fluid. In some examples, a door closure system is configured to replace a conventional door hinge and to control motion of the door by employing two opposing springs.

21 Claims, 28 Drawing Sheets

SECTION A-A

(51) Int. Cl.

| | |
|---|---|
| ***E05F 1/12*** | (2006.01) |
| ***E05F 3/04*** | (2006.01) |
| ***E05F 3/10*** | (2006.01) |
| ***E05F 3/12*** | (2006.01) |
| ***E05F 3/18*** | (2006.01) |
| ***E05F 5/02*** | (2006.01) |
| ***E05F 5/08*** | (2006.01) |

(52) U.S. Cl.
CPC ................ *E05F 3/10* (2013.01); *E05F 3/104* (2013.01); *E05F 3/12* (2013.01); *E05F 3/18* (2013.01); *E05F 5/02* (2013.01); *E05F 5/08* (2013.01); *E05Y 2201/21* (2013.01); *E05Y 2201/212* (2013.01); *E05Y 2201/256* (2013.01); *E05Y 2201/264* (2013.01); *E05Y 2201/474* (2013.01); *E05Y 2201/638* (2013.01); *E05Y 2800/21* (2013.01); *E05Y 2800/41* (2013.01); *E05Y 2900/132* (2013.01)

(58) Field of Classification Search
CPC .. E05F 1/1223; E05F 5/08; E05F 5/02; E05Y 2800/41; E05Y 2800/21; E05Y 2201/638; E05Y 2201/474; E05Y 2201/264; E05Y 2201/256; E05Y 2900/132
See application file for complete search history.

(56) References Cited

U.S. PATENT DOCUMENTS 1,241,083 A * 9/1917 Bommer ................... E05F 3/20 16/54
1,700,086 A 1/1929 Alonson
1,704,217 A 3/1929 Rosenthal
1,730,646 A 10/1929 Danner
1,736,175 A 11/1929 Rosenthal
1,965,806 A 7/1934 Riggins
2,015,989 A 10/1935 Bommer
2,118,950 A * 5/1938 Stannard ................... E05F 3/20 16/256
2,127,327 A * 8/1938 De Millar ................. E05F 3/08 16/54
2,164,358 A * 7/1939 Stannard ................... E05F 3/20 16/54
2,695,807 A 11/1954 Bissot
2,740,308 A 4/1956 Blanchard
2,869,913 A 1/1959 Schlaage
3,284,841 A 11/1966 Patriquin
3,367,454 A * 2/1968 Scherer ................... F16F 9/486 188/289
3,400,796 A 9/1968 Savins
3,408,683 A * 11/1968 Zahn ......................... F16F 9/08 16/65
3,487,494 A * 1/1970 De Baan ................... E05F 3/04 16/51
3,489,087 A 1/1970 Soderberg
3,537,126 A * 11/1970 Yoshitaka ................. E05F 3/20 16/50
3,548,977 A 12/1970 Morgan
3,952,365 A 4/1976 Grisebach
3,958,673 A * 5/1976 Allinquant .............. F16F 9/348 188/315
3,979,790 A 9/1976 Chiarappa
4,358,870 A * 11/1982 Hong ........................ E05F 3/20 16/53
4,452,437 A * 6/1984 Lochner ............... C10M 107/34 188/289
4,573,238 A * 3/1986 Phillips ................... E05F 3/102 137/513.5
4,590,639 A 5/1986 Fritsche
4,658,468 A 4/1987 Tillmann
4,829,628 A * 5/1989 Vuksic ...................... E05F 3/20 16/DIG. 9
5,078,552 A 1/1992 Albel
5,082,317 A 1/1992 Delaney, Jr.
5,152,029 A * 10/1992 Pai ............................ E05F 3/20 16/54
5,172,929 A 12/1992 Butsuen
5,205,015 A * 4/1993 Huang ...................... E05F 3/20 16/303
5,222,845 A 6/1993 Goldstein
5,419,013 A * 5/1995 Hsiao ..................... A47K 13/12 16/319
5,507,070 A * 4/1996 Spyche, Jr. .......... A61G 17/032 16/49
5,529,154 A * 6/1996 Tanaka .................. F16F 9/3484 188/280
5,579,874 A * 12/1996 Jeffries ................... F16F 9/516 267/64.11
5,651,536 A * 7/1997 Daul ..................... E05F 1/1215 16/50
5,855,040 A * 1/1999 Lin ........................... E05D 5/10 16/50
5,924,714 A 7/1999 Farris
6,112,368 A * 9/2000 Luckett ..................... E05F 3/12 16/49
6,205,619 B1 * 3/2001 Jang .......................... E05F 3/20 16/50
6,237,959 B1 5/2001 Hishon
6,442,795 B1 * 9/2002 Chen ....................... E05F 3/104 16/60
6,634,033 B2 * 10/2003 Mizuno ..................... F16F 9/14 4/248
6,711,856 B1 3/2004 Hoffman
6,799,663 B2 * 10/2004 Dubach ..................... F16F 7/09 188/322.22
6,824,335 B2 11/2004 Lynch
6,829,807 B2 * 12/2004 Kim .......................... E05F 3/20 16/322
6,854,161 B2 * 2/2005 Lee ........................... E05F 3/20 16/50
6,957,807 B2 * 10/2005 Zimmer .................... E05F 5/10 267/64.11
7,234,569 B2 * 6/2007 Salice ..................... E05F 5/006 267/209
7,243,394 B2 * 7/2007 Kao .......................... E05F 3/20 16/284
7,357,231 B2 * 4/2008 Kim .......................... E05F 5/02 188/290
7,410,154 B2 * 8/2008 Lam ........................ F16F 9/512 267/221
7,484,914 B1 2/2009 Weinstein
7,584,829 B2 * 9/2009 Schmidt ................ F16F 9/3484 188/280
7,628,257 B1 12/2009 Lue
7,825,045 B1 11/2010 Wagner
7,845,050 B2 * 12/2010 Pyo ....................... F16F 9/3405 16/85
7,861,371 B2 1/2011 Kim
7,918,167 B2 4/2011 Tanielian
7,966,693 B2 * 6/2011 Choi ......................... E05F 3/20 16/284
7,975,994 B2 * 7/2011 Born ....................... F16F 9/483 267/226
8,104,140 B2 * 1/2012 Bassi .................... F16F 9/3242 16/84
8,123,005 B2 * 2/2012 Bantle ................... F16F 9/0218 16/84
8,127,901 B1 * 3/2012 Lu ........................... F16F 9/585 188/282.5
8,276,497 B2 10/2012 Hunn
8,348,028 B2 * 1/2013 Zimmer .................. F16F 9/368 188/134
8,499,908 B2 * 8/2013 Barker .................... F16F 9/532 188/267.2
8,657,085 B2 * 2/2014 Ogawa .................. F16F 9/3221 188/322.18
8,863,356 B2 * 10/2014 Bacchetti .................. E05F 3/10 16/54

(56) References Cited

U.S. PATENT DOCUMENTS 8,925,695 B2 * 1/2015 Rioja Calvo ............. E05F 5/02 188/282.1
8,943,652 B2 2/2015 Bacchetti
8,966,712 B1 * 3/2015 Yu ............................ E05F 3/02 16/69
9,121,211 B1 * 9/2015 White ....................... E05F 5/02
9,127,493 B2 * 9/2015 Zimmer .................. F16F 9/368
9,152,183 B2 * 10/2015 Kurczewski .......... G06F 1/1681
9,217,485 B2 * 12/2015 Wu ....................... F16F 9/3415
9,303,709 B2 * 4/2016 Manes ...................... F16F 9/10
9,360,076 B2 * 6/2016 Svara ........................ F16F 9/18
9,410,354 B2 * 8/2016 Nakasone ................. F03G 1/10
9,416,570 B1 * 8/2016 Colombo ............ E05D 11/0018
9,453,550 B2 * 9/2016 Smith ....................... F16F 9/53
9,498,690 B2 11/2016 Carlson
9,534,435 B2 * 1/2017 Dora ..................... F24C 15/023
9,605,462 B2 * 3/2017 Bacchetti .................. E05F 3/20
9,617,772 B1 * 4/2017 Chen ..................... E05F 1/1016
9,682,605 B2 * 6/2017 Ankney .................. F16F 9/516
9,719,285 B2 8/2017 Nagl et al.
9,777,790 B2 * 10/2017 Mizuno ................. F16F 9/3485
9,890,574 B2 * 2/2018 Kruedener .............. E05D 3/142
9,920,563 B2 * 3/2018 Löhken ................. F16F 9/3221
9,926,731 B2 * 3/2018 Bacchetti .................. E05F 5/06
9,926,732 B2 * 3/2018 Bacchetti .................. E05F 3/20
9,970,831 B2 5/2018 Shih
10,017,082 B2 7/2018 Zwaan
10,041,560 B2 * 8/2018 Ankney .................. F16F 9/368
10,047,818 B2 * 8/2018 Nakasone ............. F16F 13/005
10,107,352 B2 * 10/2018 Grzesik ................... F16F 9/585
10,145,162 B2 * 12/2018 Liang ...................... E05F 3/108
10,161,173 B2 * 12/2018 Kruedener ................ E05F 5/10
10,221,915 B2 * 3/2019 Kull ........................ E05C 17/30
10,246,924 B2 * 4/2019 Hopkins ................... E05F 5/02
10,258,146 B2 * 4/2019 Hansen ..................... F16F 9/19
10,371,097 B2 8/2019 Sellinger
10,428,896 B2 * 10/2019 Zimmer .................... F16F 9/19
10,443,678 B2 10/2019 Galindo Rosales
10,462,578 B2 10/2019 Hoskins
10,480,281 B2 11/2019 Al-Olayan
10,480,604 B2 * 11/2019 Romano ................... F16F 9/34
10,557,513 B2 * 2/2020 Pecar ....................... F16F 9/363
10,570,935 B2 * 2/2020 Koscielniak .......... F15B 15/226
10,580,231 B2 3/2020 Lin
10,626,651 B2 * 4/2020 Chang ....................... E05F 3/20
10,633,905 B2 * 4/2020 Feng ..................... E05F 1/1223
10,677,309 B2 * 6/2020 Ericksen ............... F16F 9/3405
10,718,144 B2 * 7/2020 Wang ........................ E05F 3/14
10,829,975 B2 * 11/2020 Wu ......................... E05F 1/066
10,837,213 B2 * 11/2020 Talpe ........................ E05F 3/12
10,858,873 B2 * 12/2020 Talpe .................... E05F 1/1207
10,865,597 B2 * 12/2020 Chen ..................... F16F 13/007
10,920,474 B2 2/2021 Shinmura
10,995,813 B2 * 5/2021 Yamashita ................ F16F 9/34
11,008,794 B2 * 5/2021 Chen ..................... F16K 15/026
11,041,335 B2 * 6/2021 Chen ..................... E05F 1/1215
11,053,722 B2 * 7/2021 Teta .......................... E05D 3/02
11,072,964 B2 * 7/2021 Teta ........................ E05F 1/006
11,230,869 B2 * 1/2022 Weber ................... F16F 13/007
11,261,639 B2 * 3/2022 Held ......................... F16F 9/56
11,268,589 B2 * 3/2022 Zimmer .................. F16F 9/348
11,274,483 B2 * 3/2022 Benedetti .................. E05F 3/12
11,344,955 B2 5/2022 Majer
11,465,218 B2 10/2022 DeGowske
11,519,476 B2 * 12/2022 Gross ........................ F16F 9/49
11,536,344 B2 * 12/2022 Kimishima ........... F16K 1/2263
11,566,641 B1 1/2023 Boundy
11,592,039 B1 2/2023 Boundy
11,828,100 B2 * 11/2023 Benedetti .................. E05F 3/20
11,828,308 B1 * 11/2023 Lang ......................... F16F 9/30
11,828,309 B1 11/2023 Lang et al.
11,841,065 B2 * 12/2023 Boundy .................... F16F 9/30
11,866,977 B2 * 1/2024 Boundy ................ B23B 49/026
11,867,252 B2 * 1/2024 Boundy .................. E05D 11/08
11,993,975 B2 * 5/2024 Boundy .................. B23B 47/28
12,025,206 B2 * 7/2024 Boundy .................... F16F 9/19
2002/0010977 A1 1/2002 Salice
2003/0155196 A1 8/2003 Nishiyama
2003/0200623 A1 * 10/2003 Hung .................... E05F 1/1207 16/50
2003/0213663 A1 11/2003 Salice
2004/0068833 A1 4/2004 Sawa
2005/0034269 A1 2/2005 Jinbo
2006/0207843 A1 * 9/2006 Migli .................... F16F 9/3214 188/282.1
2006/0278483 A1 12/2006 Jiang
2007/0041800 A1 2/2007 Santos
2007/0251052 A1 * 11/2007 Pyo ........................... E05F 5/10 16/86 A
2009/0028691 A1 1/2009 Huang
2009/0119873 A1 5/2009 Bassi
2009/0236783 A1 * 9/2009 Doffing ................. F16F 9/0254 267/124
2009/0241287 A1 10/2009 Reid
2009/0241289 A1 10/2009 Choi et al.
2009/0272463 A1 11/2009 Smith
2010/0066051 A1 3/2010 Haugen
2010/0132161 A1 6/2010 Vu
2010/0162521 A1 7/2010 Pyo
2010/0170062 A1 7/2010 Kim
2010/0287729 A1 * 11/2010 Jin ............................ E05F 3/12 16/72
2010/0319260 A1 12/2010 Sawa
2011/0127706 A1 * 6/2011 Sims ...................... B60G 17/08 267/221
2011/0253493 A1 * 10/2011 Svara .................... F16F 9/3228 188/313
2011/0283478 A1 11/2011 Berry
2011/0302743 A1 * 12/2011 Kim ...................... E05F 1/1215 16/248
2012/0061194 A1 * 3/2012 Yu .......................... F16F 9/483 188/288
2012/0233810 A1 9/2012 Salutzki
2013/0097805 A1 4/2013 Bland
2014/0033476 A1 2/2014 Bacchetti
2014/0319850 A1 10/2014 Berger
2014/0352111 A1 12/2014 Ng
2015/0040998 A1 * 2/2015 Gilstad ............... F04B 53/1087 137/514
2016/0177611 A1 6/2016 Rissone
2016/0215552 A1 7/2016 Lohken
2016/0238100 A1 8/2016 Smith
2016/0305156 A1 10/2016 Kamody
2017/0037669 A1 2/2017 Kruedener
2017/0096850 A1 4/2017 Hopkins
2017/0138433 A1 * 5/2017 Wang ........................ F16F 9/50
2017/0210458 A1 7/2017 Tothill
2017/0226682 A1 8/2017 Duckworth
2017/0304057 A1 * 10/2017 Bichler ................... F16F 9/512
2017/0350466 A1 * 12/2017 Böhrer .................... F16F 9/062
2018/0010614 A1 1/2018 Sellinger
2018/0266512 A1 9/2018 Zimmer
2018/0328445 A1 * 11/2018 Gilbert ...................... F16F 9/44
2018/0355945 A1 * 12/2018 De Kock .............. F16F 9/3488
2019/0024748 A1 * 1/2019 Rioja Iribarren ....... F16F 9/362
2019/0040667 A1 2/2019 Feng
2019/0128362 A1 * 5/2019 Naserimojarad ....... F16F 9/532
2019/0330903 A1 10/2019 Talpe
2019/0371090 A1 12/2019 Lin
2019/0390496 A1 * 12/2019 Bacchetti .................. E05F 3/10
2020/0011110 A1 1/2020 Boundy
2020/0238780 A1 7/2020 Dhaens
2020/0240190 A1 7/2020 Held
2020/0299995 A1 9/2020 Eolckhoff
2020/0332581 A1 10/2020 Balbo di Vinadio et al.
2020/0408019 A1 12/2020 Vos
2021/0180381 A1 * 6/2021 Wu ........................... E05D 3/02
2022/0010592 A1 1/2022 Kirk
2022/0220788 A1 7/2022 Boundy
2022/0221019 A1 7/2022 Boundy
2022/0221020 A1 7/2022 Boundy
2023/0039706 A1 * 2/2023 Enders .................... F16F 9/512

(56) References Cited

U.S. PATENT DOCUMENTS

| | | | | |
|---|---|---|---|---|
| 2023/0123139 | A1* | 4/2023 | Talpe | E05D 3/02 16/54 |
| 2023/0146774 | A1* | 5/2023 | Talpe | E05F 3/08 16/54 |
| 2023/0295968 | A1* | 9/2023 | Lee | E05F 3/104 16/221 |
| 2023/0304342 | A1 | 9/2023 | Boundy et al. | |
| 2023/0304346 | A1 | 9/2023 | Boundy et al. | |
| 2023/0340823 | A1* | 10/2023 | Buchalo | E05F 3/04 |
| 2023/0373014 | A1 | 11/2023 | Block | |

FOREIGN PATENT DOCUMENTS

| | | | | |
|---|---|---|---|---|
| CN | 210087086 | U | | 2/2020 |
| DE | 202006006422 | | | 8/2006 |
| DE | 202006011846 | | | 12/2007 |
| DE | 102008014329 | A1 | | 9/2009 |
| EP | 0063635 | A1 | | 11/1982 |
| GB | 2589152 | A | | 5/2021 |
| JP | 1998088899 | | | 4/1988 |
| JP | H10331516 | | | 12/1998 |
| JP | H10331516 | A | * | 12/1998 |
| JP | 2003-266222 | | | 9/2003 |
| JP | 2004036885 | | | 2/2004 |
| JP | 2004-353712 | | | 12/2004 |
| JP | 2009-531631 | | | 9/2009 |
| JP | 2014-118303 | | | 6/2014 |
| KR | 200165472 | Y1 | | 2/2000 |
| KR | 10-0337469 | B1 | | 5/2002 |
| KR | 200357306 | Y1 | * | 7/2004 |
| KR | 20-2004-0018600 | | | 6/2006 |
| KR | 20070014713 | A | | 2/2007 |
| KR | 100777202 | | | 11/2007 |
| KR | 100777202 | B1 | * | 11/2007 |
| KR | 100534373 | B1 | * | 12/2017 |
| KR | 20170137390 | A | * | 12/2017 |
| KR | 102117780 | B1 | | 6/2020 |
| KR | 20220043582 | A | * | 4/2022 |
| WO | 2007116273 | A1 | | 10/2007 |
| WO | 2015/132254 | A1 | | 9/2015 |
| WO | 2020103458 | A1 | | 5/2020 |

OTHER PUBLICATIONS

Notification of Transmittal of the International Search Report and the Written Opinion of the International Searching Authority, or the Declaration, PCT/US2019/040533; Mailed on Oct. 1, 2019 (11 pages).

Notification of Transmittal of the International Search Report and the Written Opinion of the International Searching Authority, or the Declaration, PCT/US2019/040533; Mailed on Jul. 4, 2022 (16 pages).

Non-Final Office Action, U.S. Appl. No. 16/502,470, dated Jun. 30, 2021 (15 pages).

Final-Office Action, U.S. Appl. No. 16/502,470, dated Nov. 15, 2021 (14 pages).

Non-Final Office Action, U.S. Appl. No. 16/502,470, dated Mar. 4, 2022 (17 pages).

Final-Office Action, U.S. Appl. No. 16/502,470, dated Sep. 21, 2022 (16 pages).

Advisory Action, U.S. Appl. No. 16/502,470, dated Jan. 5, 2023 (7 pages).

Non-Final Office Action, U.S. Appl. No. 16/502,470, dated Jan. 31, 2023 (17 pages).

Non-Final Office Action, U.S. Appl. No. 17/570,504, dated Feb. 2, 2023 (8 pages).

Non-Final Office Action, U.S. Appl. No. 17/570,509, dated Jan. 5, 2023 (7 pages).

Notification of Transmittal of the International Search Report and the Written Opinion of the International Searching Authority, or the Declaration, PCT/US23/16082; dated Aug. 24, 2023 (20 pagers).

Advisory Action, U.S. Appl. No. 17/570,504, dated Aug. 28, 2023 (3 pages).

Non-Final Office Action, U.S. Appl. No. 16/502,470, dated Aug. 23, 2023 (22 pages).

Non-Final Office Action, U.S. Appl. No. 17/570,509 dated Jul. 18, 2023 (9 pages).

Non-Final Office Action, U.S. Appl. No. 17/555,738, dated Aug. 9, 2024 (69 pages).

Final Office Action, U.S. Appl. No. 17/570,504, dated Apr. 5, 2023 (13 pages).

Final Office Action, U.S. Appl. No. 17/570,509, dated Apr. 6, 2023 (11 pages).

United States Patent and Trademark Office, "Final Office Action", issued in connection with U.S. Appl. No. 17/555,738, dated Feb. 14, 2025, 38 pages.

United States Patent and Trademark, "Non-Final Office Action", issued in connection to U.S. Appl. No. 17/570,515, mailed Sep. 17, 2024, 7 pages.

United States Patent and Trademark, "Non-Final Office Action", issued in connection to U.S. Appl. No. 18/188,848, mailed Sep. 9, 2024, 10 pages.

Non-Final Office Action, U.S. Appl. No. 18/188,853 dated Sep. 20, 2024 (56 pages).

Non-Final Office Action, U.S. Appl. No. 18/188,861 dated Sep. 20, 2024 (57 pages).

Non-Final Office Action, U.S. Appl. No. 18/188,859 dated Sep. 24, 2024 (58 pages).

Final Office Action, U.S. Appl. No. 18/188,848 dated Mar. 11, 2025 (10 pages).

Final Office Action, U.S. Appl. No. 18/188,859 dated Apr. 4, 2025 (26 pages).

Final Office Action, U.S. Appl. No. 18/188,861 dated Apr. 9, 2025 (31 pages).

* cited by examiner

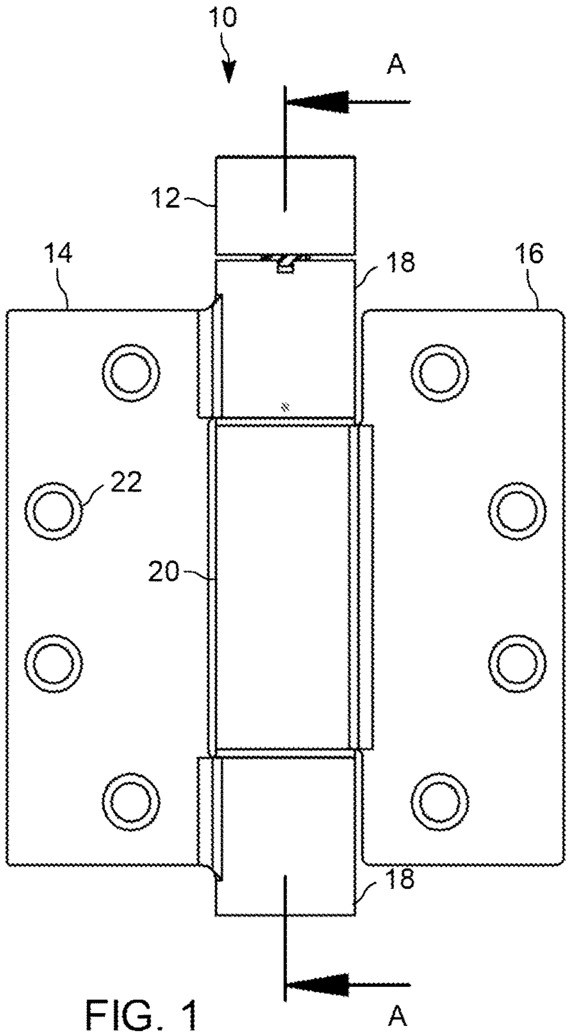
FIG. 1
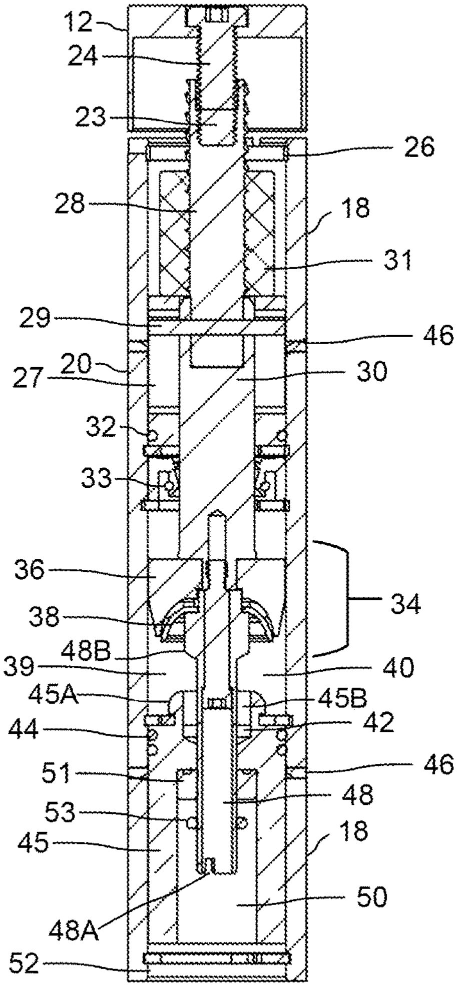
FIG. 2 SECTION A-A

SECTION B-B

SECTION A-A

SECTION A-A

SECTION B-B

SYSTEMS AND DEVICES FOR MOTION CONTROL

CROSS-REFERENCE TO RELATED APPLICATIONS

This application hereby claims priority to and the benefit of U.S. Provisional Application Ser. No. 63/322,919, entitled "SYSTEMS AND DEVICES FOR MOTION CONTROL," filed Mar. 23, 2022. The contents of U.S. Provisional Application Ser. No. 63/322,919 are hereby incorporated by reference in their entirety for all purposes.

BACKGROUND

The slamming of a door can cause many problems. For instance, there is the risk that the door could be slammed on a person's fingers—often the fingers of a child. Additionally, slamming a door may result in a person or a pet being locked in a room. Moreover, nobody enjoys the loud sound of a slammed door. Besides the slamming of a door, there are numerous other situations, especially in industrial settings, where, if motion of an object is not adequately dampened or controlled, the motion can cause damage to equipment, harm to a person, and/or unpleasant noises.

SUMMARY

The systems and devices described herein utilize a Shear Thickening Fluid (STF) to allow a door to close normally when lighter pressure is applied during closure and to dampen, slow, and/or stop a door from slamming when greater pressure or speed is applied. STF is relaxed at rest and behaves nearly like most viscous liquids under minimal shear or pressure (e.g., flowable, pourable, etc.). Under normal closing conditions, the fluid remains relaxed and the door closes easily. When pressure or shear forces are applied, the fluid stiffens instantaneously, providing the functionality needed to work with devices described herein, which act to control the speed of a door or other devices. Adjustability of the amount of resistance has been designed into the devices as well.

BRIEF DESCRIPTION OF THE DRAWINGS

FIG. 1 illustrates a side view of an example hinge system incorporated in a hinge according to an embodiment of the present technology.

FIG. 2 illustrates a cross-sectional view of the inner mechanics of an example hinge assembly according to an embodiment of the present technology.

Figure 3:
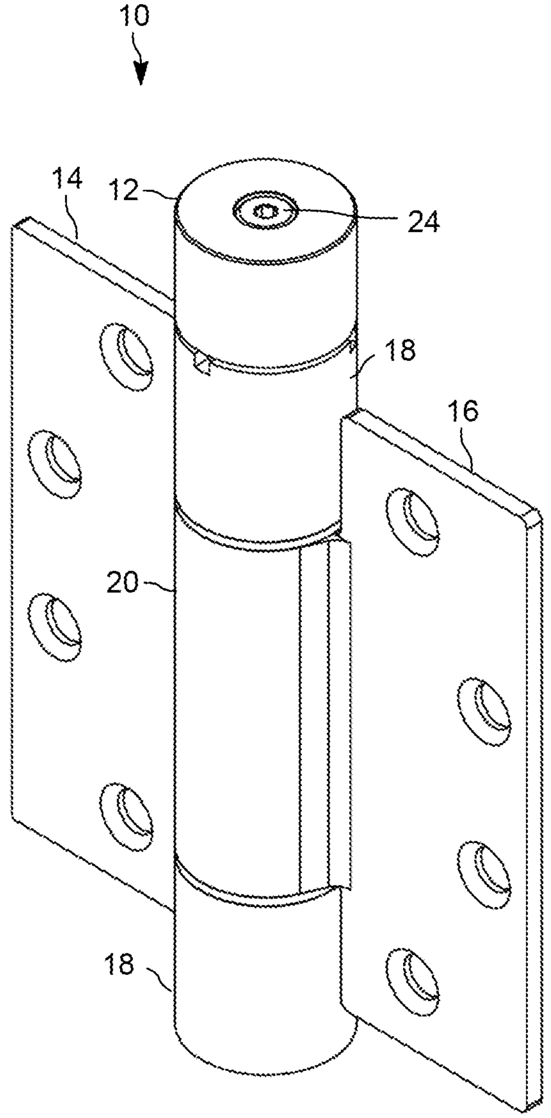
FIG. 3 illustrates a perspective view of an example hinge system incorporated in a hinge according to an embodiment of the present technology.
Figure 4:
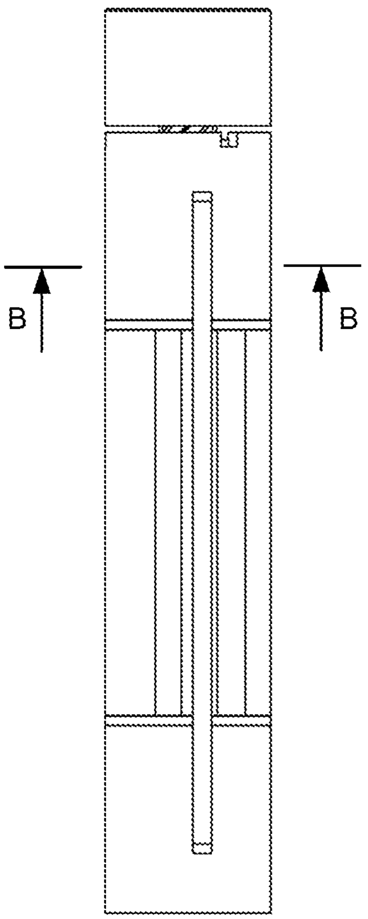
FIG. 4 illustrates a side view of an example hinge system incorporated in a hinge according to an embodiment of the present technology.
Figure 5:
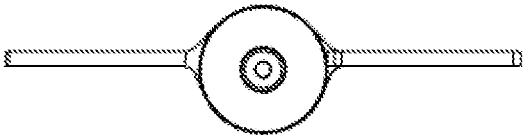
FIG. 5 provides a cross-sectional view of an example hinge assembly according to an embodiment of the present technology.
Figure 6:
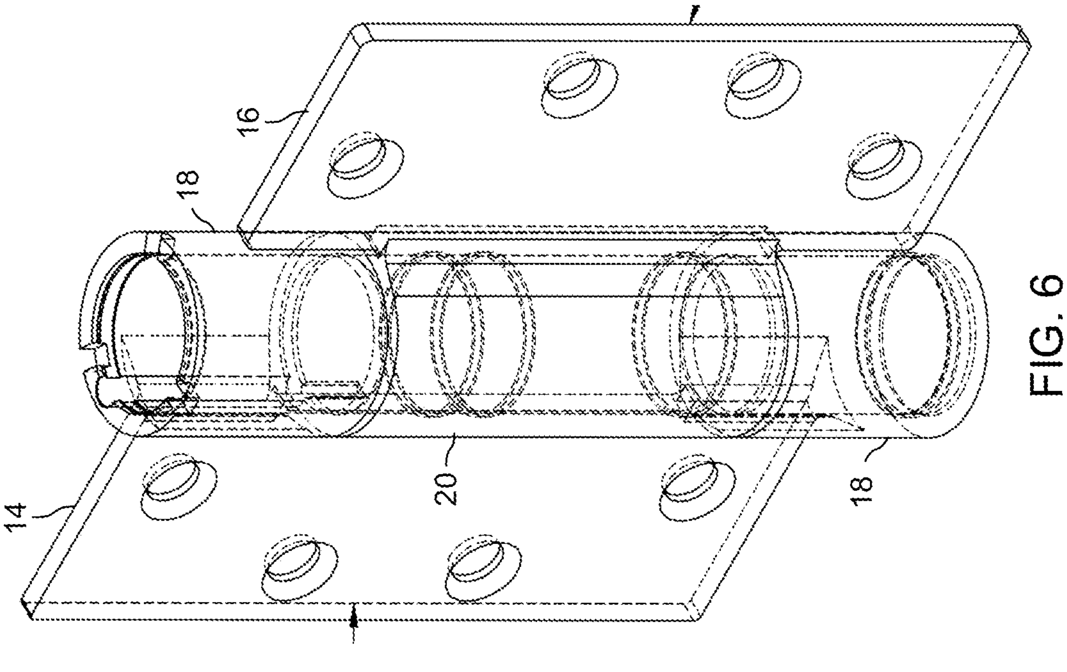
FIG. 6 illustrates a perspective view of an example hinge according to an embodiment of the present technology.
Figure 7:
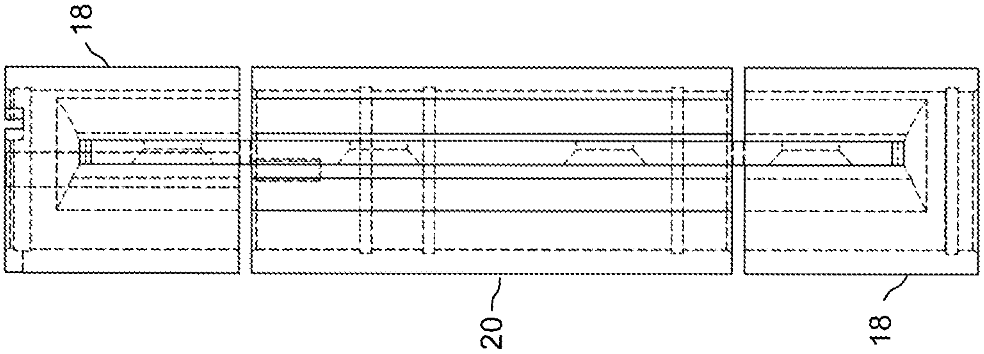
FIG. 7 illustrates a side view of an example hinge according to an embodiment of the present technology.
Figure 8:
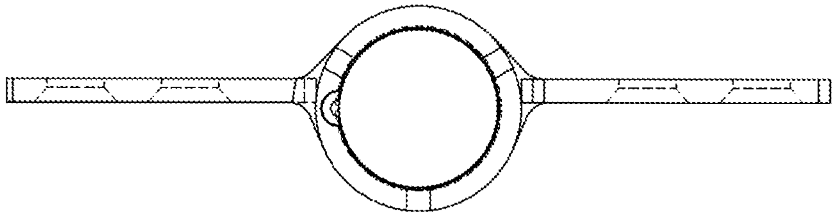
FIGS. 8 and 9 illustrate top and bottom views of an example hinge according to an embodiment of the present technology.
Figure 9:
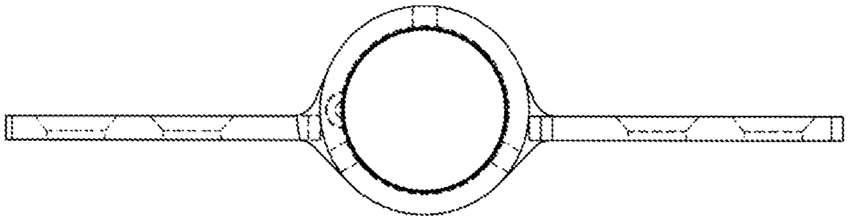

The foregoing summary, as well as the following detailed description of certain embodiments of the present technology(s), will be better understood when read in conjunction with the appended drawings.

DETAILED DESCRIPTION

Systems and devices to control rotational and/or arcuate motion are disclosed herein. In disclosed examples, a hinge system is configured to replace a conventional door hinge and to control motion of the door by employing a shear thickening fluid. In disclosed examples, a door closure system is configured to replace a conventional door hinge and to control motion of the door by employing two opposing springs. For the purpose of illustrating the technology, there are shown in the attached drawings, certain embodiments of the systems. It should be understood, however, that the technology is not limited to the arrangements and instrumentalities shown in the drawings or to the descriptions of the embodiments herein.

The Hinge System

Turning to FIGS. 1 to 25, a hinge system 10 that controls the motion of one or more devices or objects, such as the slamming of a door, is shown.

The hinge system 10 is configured to replace one or more hinges of a door. As shown in FIG. 1, a complete hinge assembly (with the system 10 incorporated through hinge leaves 14 and 16) is configured to control the closure speed of a door and/or stopping fast or forceful movements with a combination of STF resistance combined with the mechanicals disclosed herein. Users can replace one or more of their existing door hinges to have the control they desire.

The disclosed hinge system 10 can be provided in right hand and left-hand versions and can be a complete assembly for the user to install. In other words, no assembly is required by the user, just installation. For example, a first leaf 14 is attached to the door and a second leaf 16 is attached to the jamb of the door.

With reference to FIGS. 1 and 2, the hinge system 10 turns the rotary motion of the hinge into linear motion using a lead screw mechanism 28 combined with a plunger bushing 27, the lead screw mechanism 28 to drive a plunger rod 30 which drives a piston assembly 34 (including a piston head 36 and/or a rebound shim 38) though a chamber 40 containing STF 39 as the door is closed. A nut 31 is in a fixed position relative to a knuckle 18 by retaining ring 26, such that the nut 31 turns with rotation of knuckle 18 relative to knuckle 20 during opening/closing of the door. The plunger bushing 27 maintains the concentric position of the plunger rod 30 such that the plunger rod 30 is configured to move vertically while maintaining alignment with the central axis (coaxial with line A-A of FIG. 1). A seal 32 (and/or associated components) serves to seal the STF chamber 40 area within knuckle 20 of the first leaf 14. The seal on the plunger rod 30 and in the STF chamber area 40 is accomplished by one or more U-cupped, high-pressure seals with spring wiper 33. One or more thrust washers 46 separate knuckle 20 from knuckles 18.

The lead screw mechanism 28 is keyed to the plunger bushing 27 with a dowel pin 29 which keeps plunger rod 30 and lead screw mechanism 28 in the same rotational position in relation to each other while allowing the lead screw mechanism 28 to travel vertically with the rotation of the hinge.

The plunger bushing 27 does not move up or down. The lead screw mechanism 28 moves up and down, which is one of the reasons for the internal space in a screw shaft 23 of cap 12 which allows lead screw mechanism 28 space to rise as the door is opened. For example, rotation of the cap 12 drives the screw 24 into or out from the screw shaft 23, changing the amount of linear movement of a piston assembly 34 when the hinges rotate relative to each other, and thus how far the door can swing open.

Both bushing 27 and hinge leaf 14 rotate with respect to hinge leaf 16. The keyways on the two hinge leafs (14, 16) line up so that the subassembly (which includes the plunger bushing 27 and pin 29 extending out of the plunger bushing 27) can be inserted as a whole cartridge during assembly, i.e., the bushing 27 and plunger rod 30 can be slid through the top knuckle 18 of hinge leaf 14 into the knuckle 20 of hinge leaf 16, as shown in FIGS. 1-9.

In operation, when the door is rotated from open to closed, the nut 31, which is secured within knuckle 18 to the hinge leaf 14 by retaining ring 26, rotates with the hinge leaf 14 relative to rotation of hinge leaf 16. As the nut 31 rotates, it causes the lead screw mechanism 28, which is connected to the plunger bushing 27 by the pin 29, to start rotating downward away from cap 12 and screw shaft 23. As the lead screw mechanism 28 rotates downward, the pin 29 slides downward in a slot 58 (FIG. 10) in the plunger bushing 27. Because the plunger rod 30 is connected to the lead screw mechanism 28 by the pin 29, the plunger rod 30 moves downward with the lead screw mechanism 28, which causes the shim 38 and piston head assembly 34 to push into the STF 39 in the chamber 40. The STF 39 reacts to the engagement from the shim 38 and piston head assembly 34 depending on how slots on the shim 38 are aligned with slots on the piston head 36, as shown in greater detail in FIGS. 13 and 18-20.

In this way, the STF 39 controls the rotary motion of the hinge leaf 16 when the hinge leaf 16 is closed. Upon opening the door, hinge leaf 14 is rotated away from hinge leaf 16, causing the nut 31 to rotate screwing the lead screw mechanism 28 back up toward the cap 12 and screw shaft 23. As the lead screw mechanism 28 screws upward, the plunger rod 30, which is connected to the lead screw mechanism 28, moves upward as well. The piston head 36 is therefore pushed against STF 39 occupying the space within the chamber 40 opposite the shim 38.

A shear thickening fluid (STF) is a class of fluids configured to have a decreasing viscosity in response to a first range of shear rates and an increasing viscosity in response to a second range of shear rates. For instance, the STF 39 (e.g., dilatant, non-Newtonian fluid) may include nanoparticles of one or more physical dimensions mixed in a carrier fluid and/or solvent. A force applied to the STF 39 results in these nanoparticles stacking up, stiffening as a result and acting more like a solid than a flowable liquid when a shear threshold is reached. In particular, viscosity of the STF 39 rises significantly when shear rate is increased to a point of the shear threshold.

For example, the STF 39 is configured to have a decreasing viscosity in response to a first range of shear rates and an increasing viscosity in response to a second range of shear rates, wherein the second range of shear rates are greater than the first range of shear rates. For example, as the door rotates open or closed, causing the piston to exert pressure against the shear thickening fluid, that motion of the door transitions from a first velocity to a second velocity when the STF 39 correspondingly responds to transitioning from the first range of shear rates to the second range of shear rates, wherein the second velocity is less than the first velocity.

A bolt 48 is connected to plunger 30 and extends therefrom into a chamber 50 of a shaft housing 45. The bolt 48 is configured to rotate relative to the plunger 30 (and piston 36) and to receive, for example, a tool or complementary bolt (not shown) within slot 48A to rotate the bolt 48. The bolt 48 is connected to the shim 38 such that rotation of the bolt 48 rotates the shim 38 relative to the piston 36. Rotation of the shim 38 adjusts alignment between shim slots and piston slots to control flow of STF 39 during movement of the plunger 30 (shown in detail in FIGS. 13-20). The chamber 50 allows space for the bolt 48 to move up and down with movement of the plunger 30.

In some examples, rotating the bolt 48 to turn the shim 38 can be limited by a block, stop, lip portion and/or protrusion 41. The protrusion 41 may be located on the bolt 48, the shim 38, the piston 36, the plunger 30, and/or an internal surface of the hinges. The protrusion 41 can be connected and oriented such that the blocking of further rotation of the bolt 48 and shim 38 in a first direction by the protrusion 41 can indicate to the user that the slots of the shim and the slots of the piston head are aligned, and that the blocking of further rotation of the bolt 48 and shim 38 in a second, opposite direction by the protrusion can indicate to the user that the slots of the shim and the slots of the piston head are not aligned. These features and operation thereof are explained with U.S. Application No. 2020/0011110 and U.S. Application No. 2022/0221019, the context of which are incorporated herein in their entirety.

In examples, a portion 45A of the shaft housing 45 extends into the chamber 40. The portion 45A is defined by an outer wall designed to mate with an internal space of the shim 38, such that, when the door is open, the shim 38 envelopes the outer wall of the portion 45A. An internal space 45B of the portion 45A is designed to receive an expanded portion 48B of the bolt 48. Therefore, when the hinge is open and the plunger 30 extends into the chamber 40 and the bolt 48 extends into chamber 50, the shim 38 mates with portion 45A, and the expanded portion 48B of the bolt 48 mates with internal space 45B. This may result in physical contact between components, and/or result in an amount of STF 39 between surfaces.

One or more bushings 51 are employed to maintain coaxial alignment of the bolt 48 with a central axis. One or more seals or O-rings 53 can be arranged along the bolt 48 and/or the bushings 51 or housing 45, to prevent or mitigate leaking of STF 39. In some examples, the bolt 48 is supported by and/or fitted with a U-cupped seal.

FIGS. 3 to 9 illustrate multiple views of the example hinge system and/or hinge.

FIGS. 10 to 14 illustrate multiple views of an example piston assembly 34, lead screw 28 and plunger bushing 27.

Figure 10:
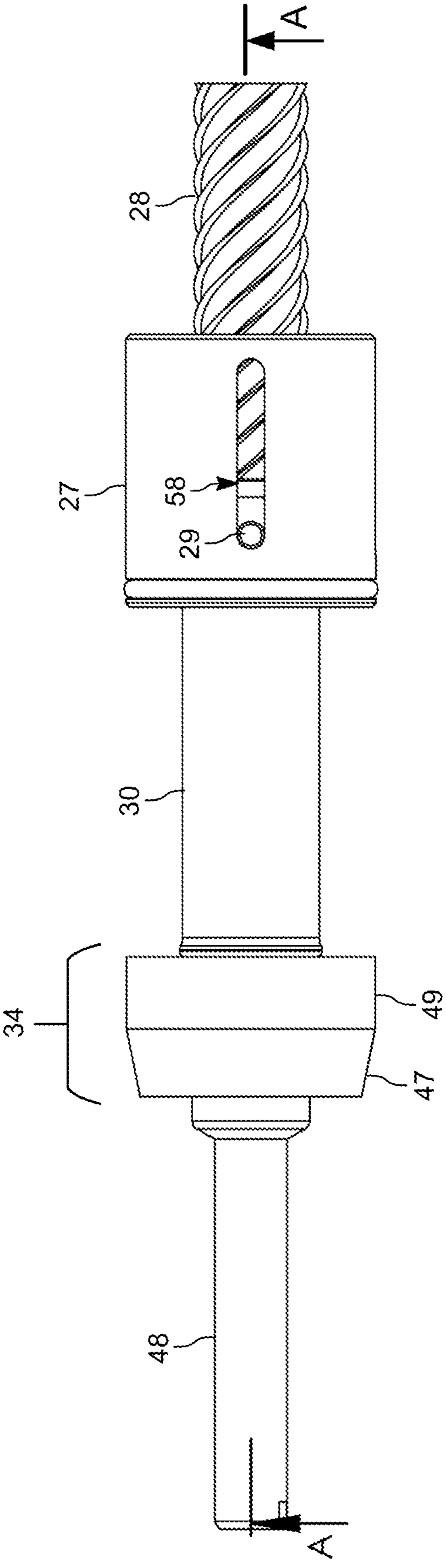
FIG. 10 illustrates a side view of an example piston assembly, lead screw mechanism and plunger bushing according to an embodiment of the present technology.
Figure 11:
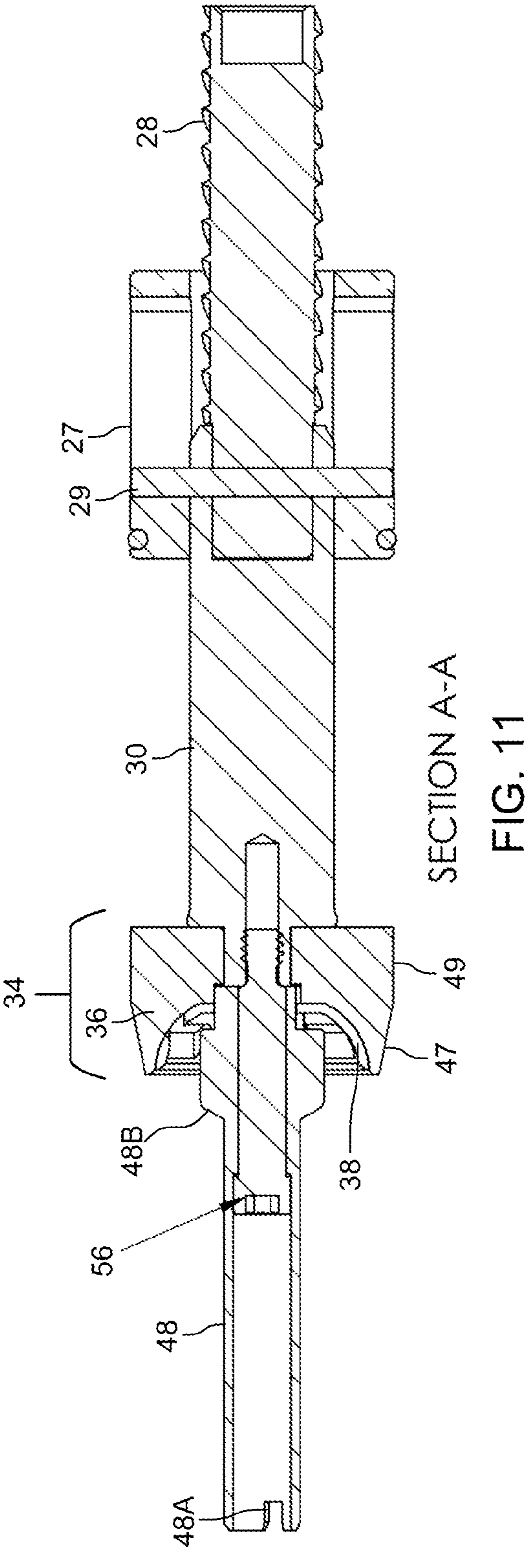
FIG. 11 illustrates a cross-sectional side view of the inner mechanics of an example piston assembly, lead screw mechanism and plunger bushing according to an embodiment of the present technology.

As shown in FIG. 10, the lead screw mechanism 28 is held in the same rotational position relative to the plunger rod 30 with the dowel pin 29. The dowel pin 29 effectively drives the plunger rod 30 since it is connected to both the lead screw mechanism 28 and the plunger rod 30. FIG. 11 illustrates a cross-sectional view of the assembly, including a shoulder bolt 56 that secures the bolt 48 to the plunger rod 30.

In some examples, the piston head 36 is shaped with an angled first portion 47 and a substantially cylindrical second portion 49. For instance, the second portion 49 may make contact with an inner wall of the chamber 40 in knuckle 20 during movement of the plunger assembly 34. This substantially prevents STF 39 flowing between the second portion 49 and the inner wall, concentrating any flow of STF 39 between slots 60 and 62 of the shim 38 and piston head 36, respectively (as shown in example FIGS. 18-20). In some examples, the shim 38 and/or piston head 36 are substantially toroidal, cylindrical, curved, rounded, cup-shaped, square, triangular, or any type of geometry suitable to create a seal between the piston head 36 and walls of the chamber 40. The chamber 40 may also be any of the aforementioned geometries, such that the second portion 49 of the piston head 36 contacts the inner wall of the chamber 40.

The angled first portion 47 channels fluid into the substantially annular opening of the shim 38, thereby ensuring the amount of resistance at the plunger assembly 34 from STF 39 is controlled by alignment of the slots 60 and 62. As shown, the shim 38 has a generally cupped shape, and, when forced into the piston head 36 by resistance of the STF 39, is received within the piston head 36 in a complementary interior. The cupped shape of the shim 38 directs the STF 39 inward, further focusing flow dynamics through the slots 60 and 62.

Figure 12:
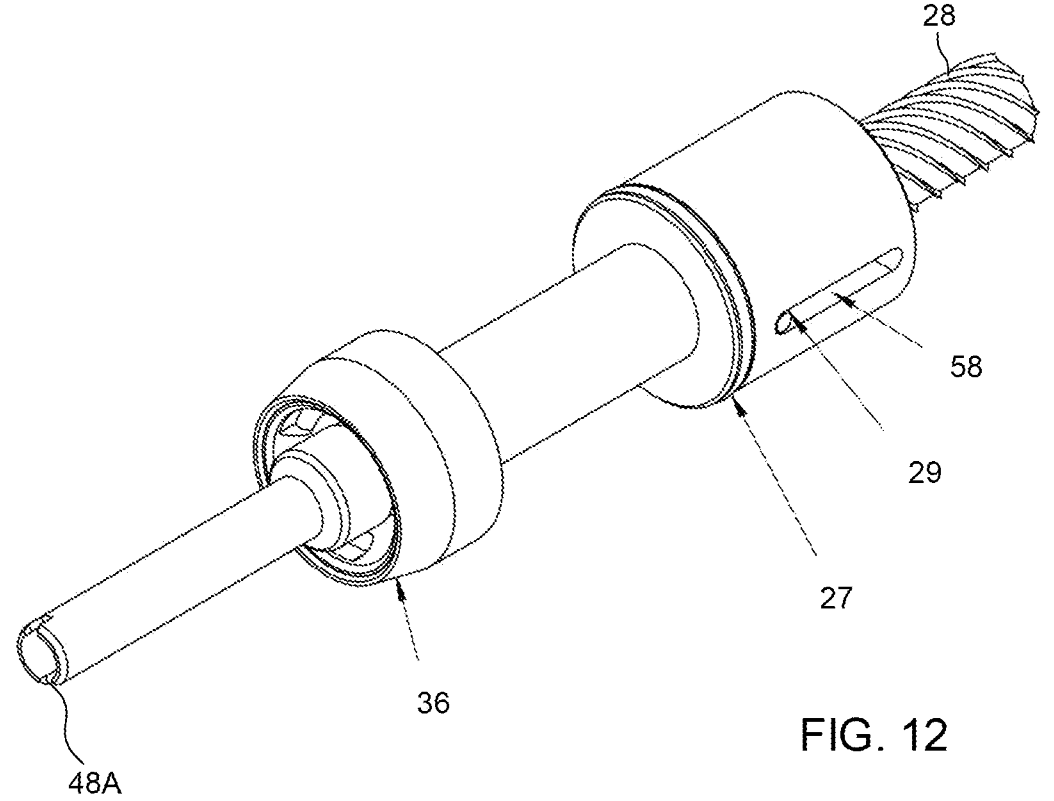
FIG. 12 illustrates a perspective view of an example piston assembly, lead screw mechanism and plunger bushing according to an embodiment of the present technology.
Figure 13:
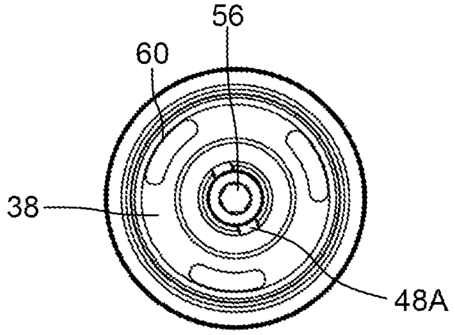
FIGS. 13 and 14 illustrate top and bottom views of an example piston assembly, lead screw mechanism and plunger bushing according to an embodiment of the present technology.
Figure 14:
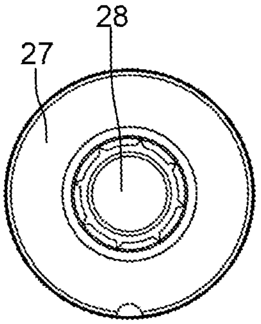

FIG. 12 illustrates a perspective view of the assembly, where plunger bushing 27 includes slot 58 oriented with the linear motion of the lead screw mechanism 28. In particular, the pin 29 extends into the slot 58 and limits the linear movement (both towards and away from the cap 12). The linear movement in turn drives the piston assembly 34 within the chamber 40. FIGS. 13 and 14 provide bottom and top views of the plunger assembly, respectively.

Figure 15:
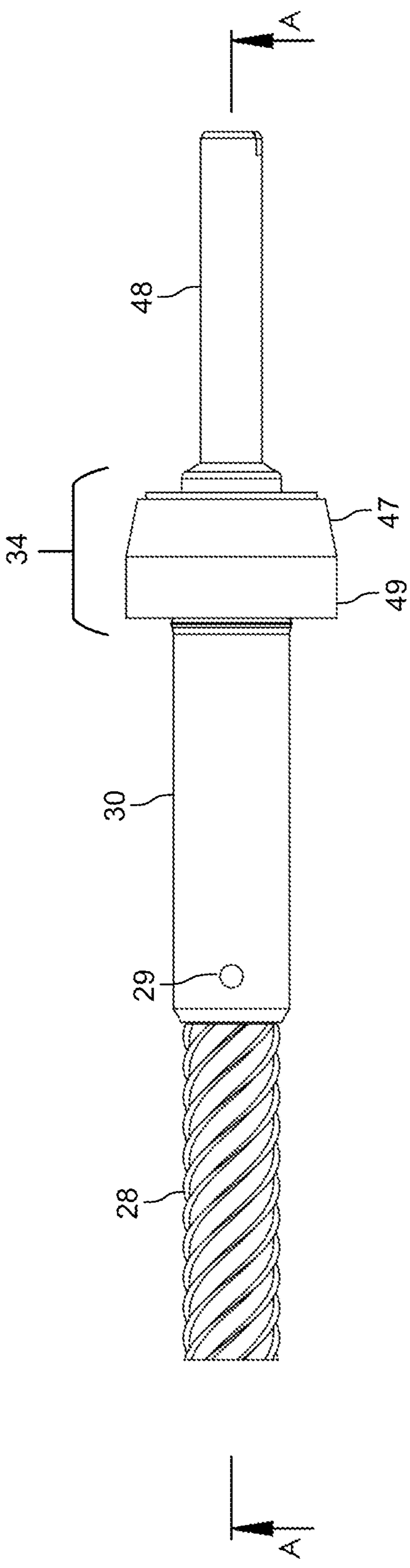
FIG. 15 illustrates a side view of an example piston assembly and lead screw mechanism according to an embodiment of the present technology.
Figure 16:
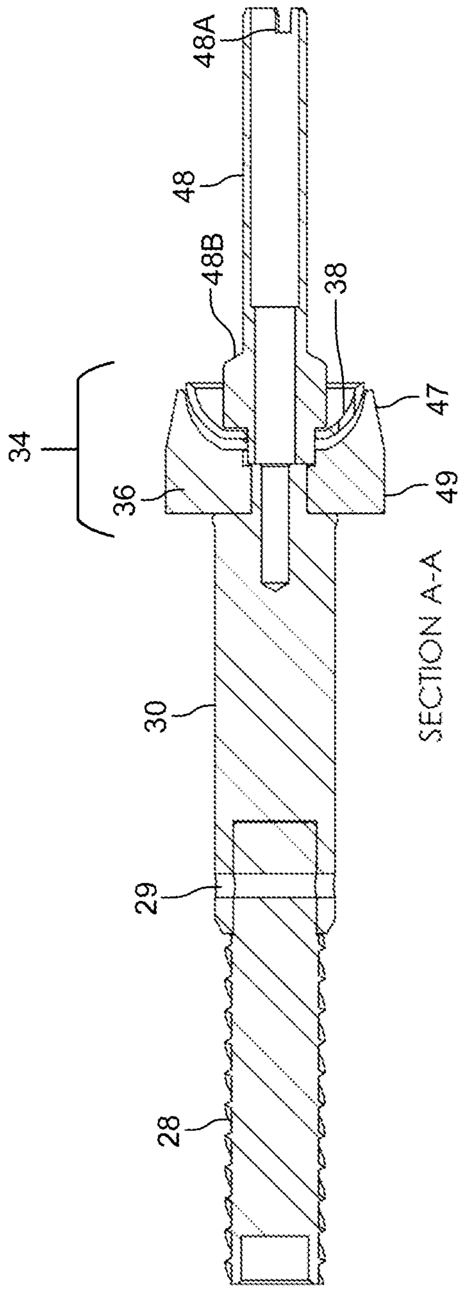
FIG. 16 illustrates a cross-sectional side view of the inner mechanics of an example piston assembly and lead screw mechanism according to an embodiment of the present technology.
Figure 17:
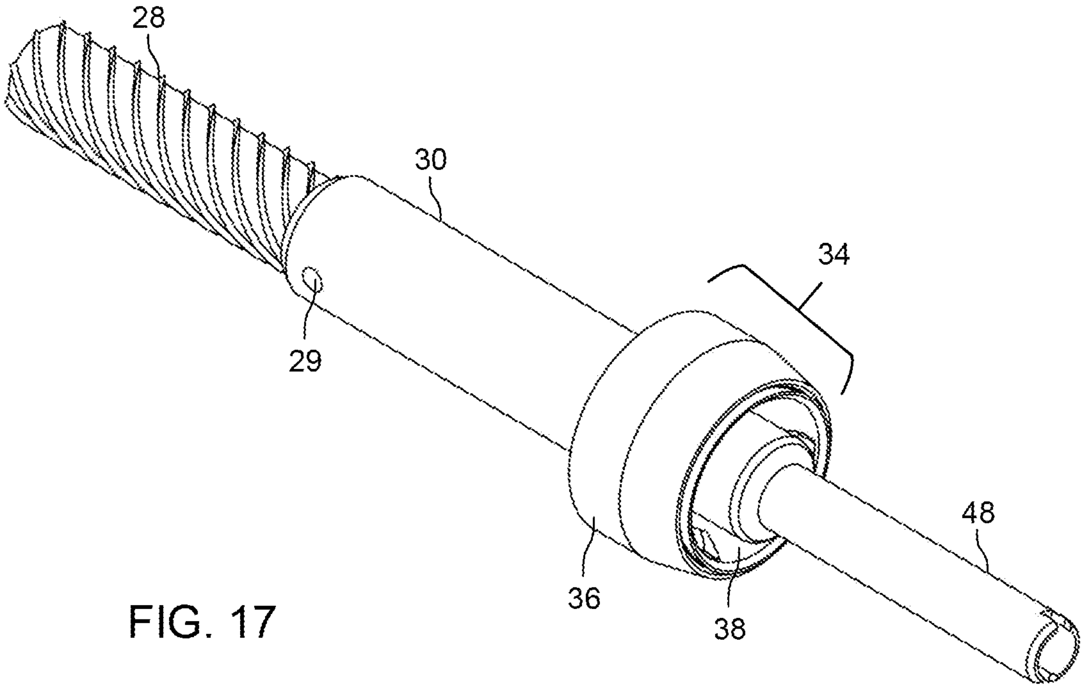
FIG. 17 illustrates a perspective view of an example piston assembly and lead screw mechanism according to an embodiment of the present technology.

FIGS. 15 to 17 illustrate side, cross-sectional side, and perspective views, respectively, of an example piston assembly 34 and lead screw mechanism 28.

Figure 18:
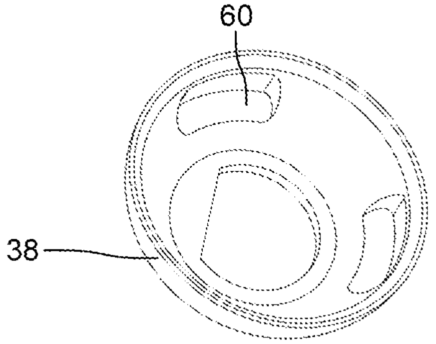
FIG. 18 illustrates a perspective view of an example shim according to an embodiment of the present technology.
Figure 19:
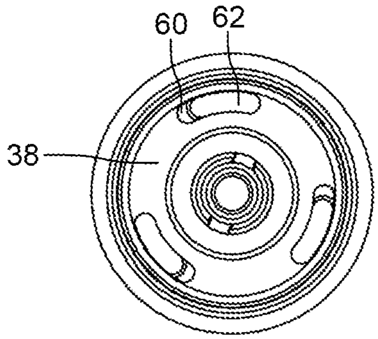
FIGS. 19 and 20 illustrate top and bottom views of an example piston assembly and lead screw mechanism according to an embodiment of the present technology.
Figure 20:
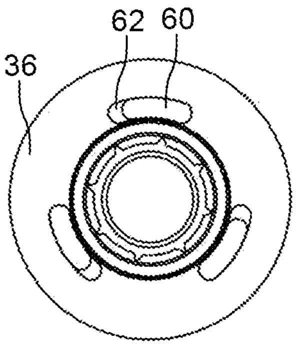
Figure 21:
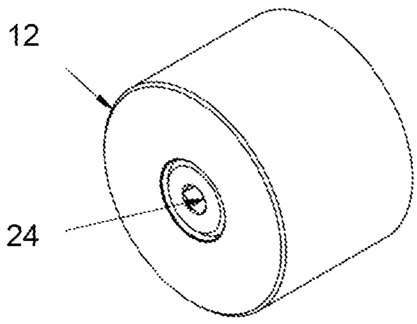
FIGS. 21 to 25 illustrate multiple views of an example cap according to an embodiment of the present technology.
Figure 22:
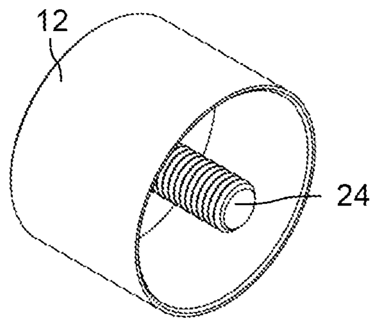
Figure 23:
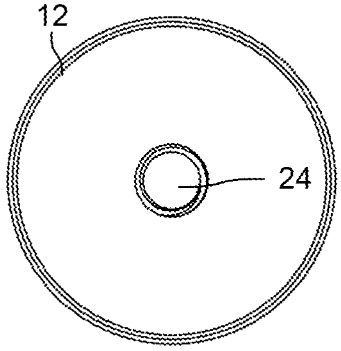
Figure 24:
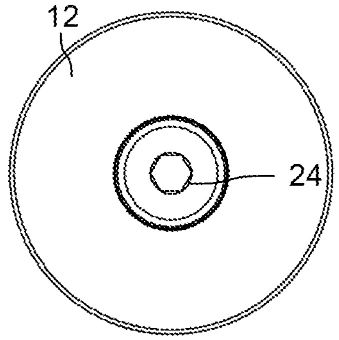
Figure 25:
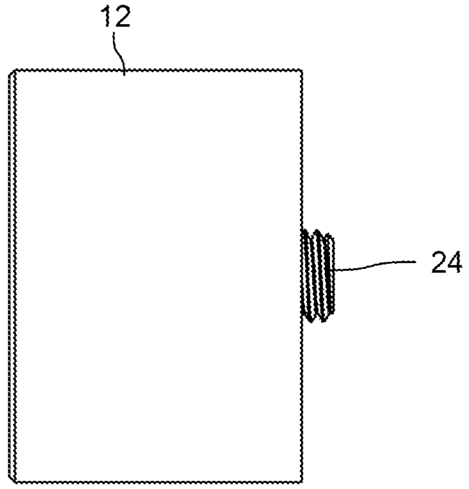

FIG. 18 illustrates a shim 38 with slots 60. FIGS. 19 and 20 provide bottom and top views of the plunger assembly, respectively. The piston head 36 includes slots 62 that extend through the piston head. For example, the figures show overlap of slots 60 and 62, illustrating the ability to limit the flow of STF 39 therethrough. In some examples, the alignment of slots 60 and 62 determines the flow rate of the STF 39 through the piston head 36 and rebound shim 38. In particular, the fluid flow is controlled by rotating the bolt 48, which passes into shaft housing 45, is connected to, and can be accessed from an end portion 52. In other words, a user can rotate bolt 48 by inserting a tool in slots 48A. Rotational adjustment of bolt 48 in turn causes the rotation of the rebound shim 38 with respect to the piston head 36, thus controlling STF flow while allowing bolt 48 to move up and down during opening and closing of the door. For example, as shown in FIGS. 11 and 16, the bolt 48 supports the shim 38, such that rotation of the bolt 48 causes the shim to rotate.

For example, as the slots 60 and 62 align, STF 39 passes through the shim 38 and piston head 36 more easily, such that the system 10 experiences reduced resistance to movement (closure) of the door. When the slots 60 and 62 are misaligned (either wholly or partly), however, the piston assembly 34 meets with greater resistance from the STF 39, such that the system 10 mitigates or prevents sudden movement (closure) of the door. Thus, alignment or misalignment of the slots 60 and 62 affects how the STF 39 controls the movement of the door.

FIGS. 21 to 25 provides multiple views of the cap 12 and the screw 24.

The Door Closure Control System

Figure 26:
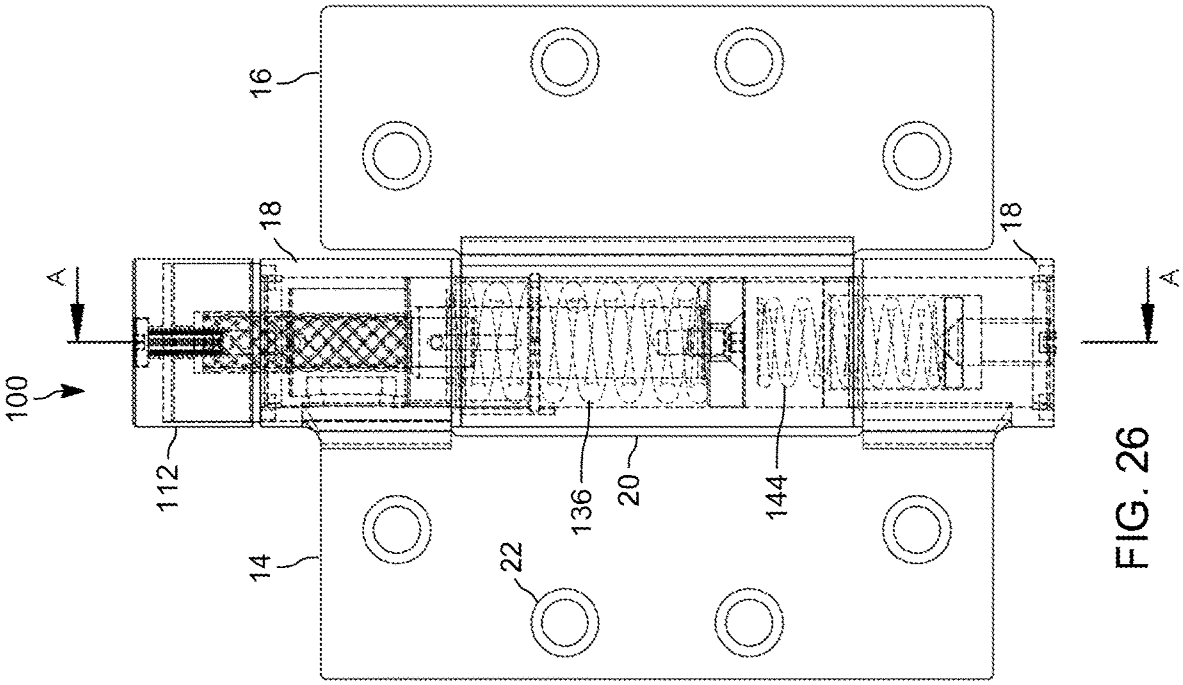
FIG. 26 illustrates a side view of an example door closure system incorporated in a hinge according to an embodiment of the present technology.

Turning to FIGS. 26 to 46, a door closure control system 100 that controls the motion of one or more devices, such as the slamming of a door, is shown. FIG. 26 illustrates a side view of an example door closure control system 100 incorporated in a hinge (similar to the hinge described with respect to FIGS. 1-25). For example, the door closure control system 100 includes a closure mechanism, driven by a door return spring 136, and a damping system, driven by a damping spring 144. Thus, the door closure control system 100 simultaneously draws an open door closed and controls the force by which the door closes.

Figure 27:
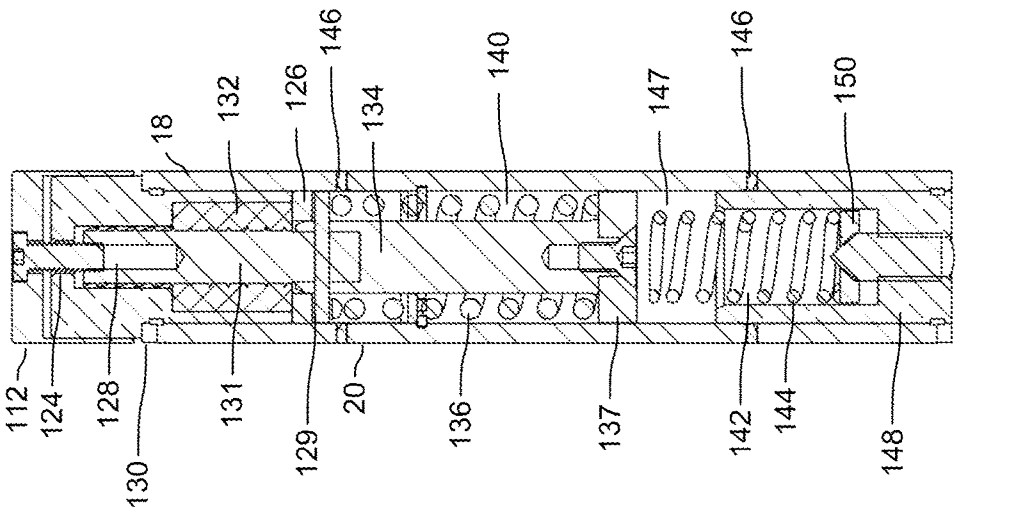
FIG. 27 illustrates a cross-sectional view of the inner mechanics of an example door closure system according to an embodiment of the present technology.

As shown in FIG. 27, a screw 124 extends through an adjustable rotation cap 112 and screws into a shaft 128 within a lead screw mechanism 131. The screw mechanism 131 is connected to a piston cartridge 134 that is connected to a plunger 137. Thus, rotation of the cap 112 drives the screw 124 into or out from the shaft 128, changing the amount of linear movement of the piston cartridge 134 when the hinges rotate relative to each other, and thus how far the door can swing open. For example, as the hinges rotate the screw 131 turns within the nut 132 to raise or lower the piston cartridge 134 and connected plunger 137 relative to the damping spring 144.

Figure 38:
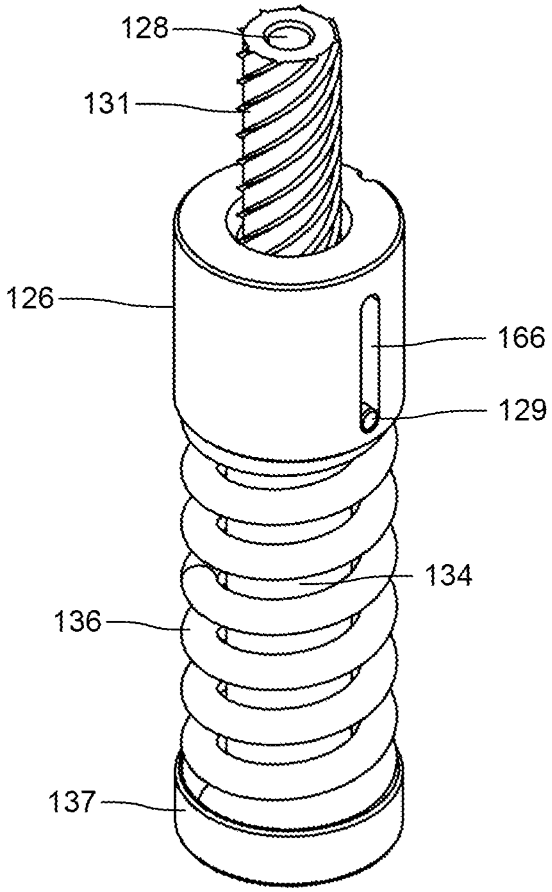
FIG. 38 illustrates a perspective view of an example piston assembly, lead screw mechanism and plunger bushing according to an embodiment of the present technology.

As shown in FIG. 27, a portion of the screw 131 extends into the cap 112, and as the rotational movement of the hinge raises the piston 134 and plunger 137, spring 136 is compressed within chamber 140, and damping spring 144 is extended within chamber 147. This vertical movement is achieved by rotational movement of the leaf 14 and knuckle 18, causing the nut 132 (which is fixed to knuckle 18 and rotates with knuckle 18) to turn relative to the screw 131, and the screw 131 to turn in a threaded channel within the nut 132. A pin 129 secures the screw 131 to the plunger 134, the pin 129 configured to slide vertically within a slot 166 of plunger bushing 126 as the screw 131 moves (as shown in FIG. 38).

As the door closes, the hinge 14 rotates in the opposite direction, causing the screw 131 to lower, as pressure from spring 136 forces the plunger 134 and piston 137 toward the damping spring 144. As the piston 137 meets resistance from spring 144, the motion of the door closing slows based on the force from spring 144. In some examples, the force from spring 144 can be adjusted, as a washer platform 150 can be raised or lowered to change a distance in which spring 144 can be compressed within space 147 and chamber 142 of lower bushing 148. One or more thrust washers 146 separate knuckle 20 from knuckles 18.

Figure 28:
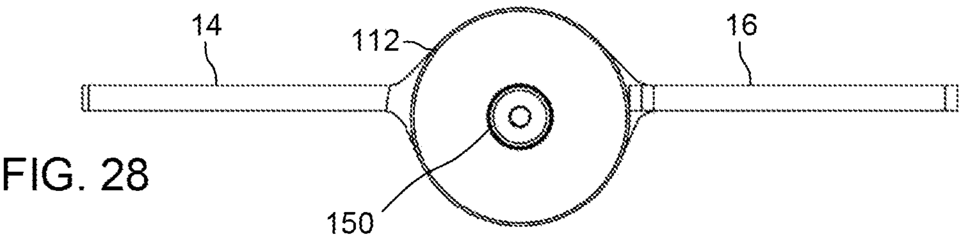
FIG. 28 illustrates a top view of an example door closure system according to an embodiment of the present technology.
Figure 29:
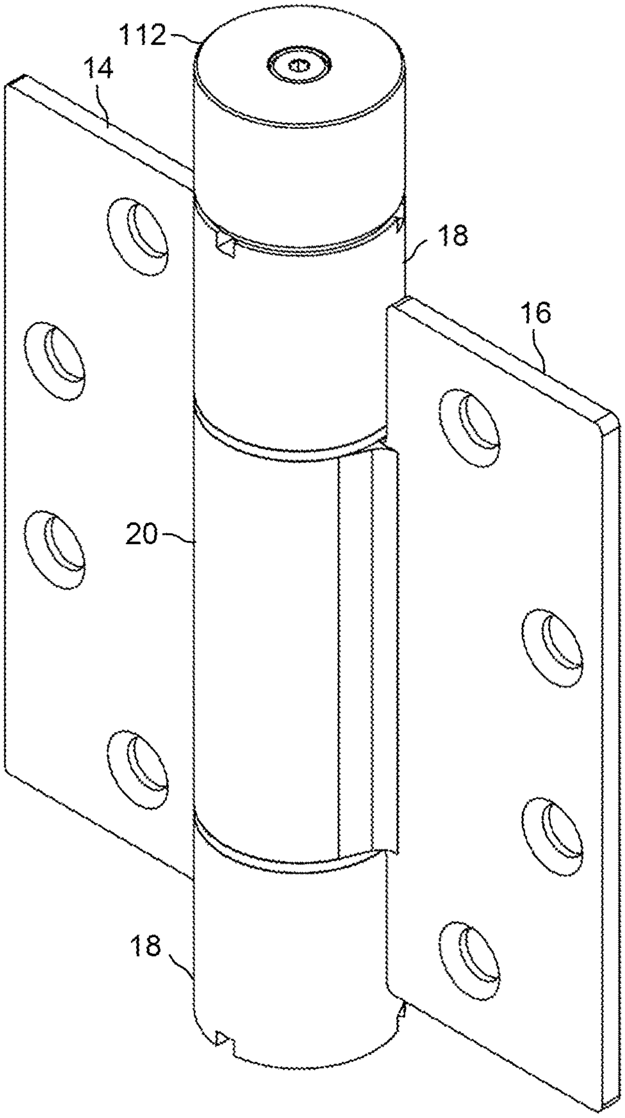
FIG. 29 illustrates a perspective view of an example door closure system incorporated in a hinge according to an embodiment of the present technology.
Figure 30:
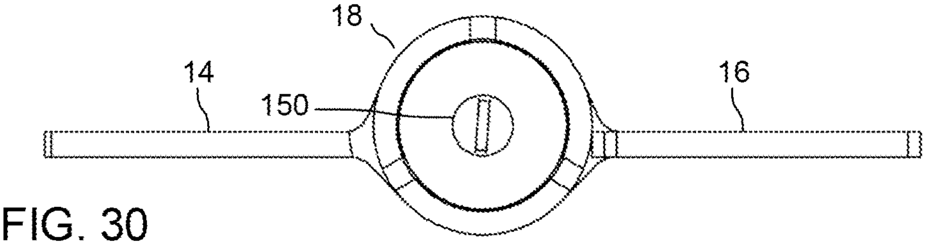
FIG. 30 illustrates a bottom view of an example door closure system according to an embodiment of the present technology.
Figure 31:
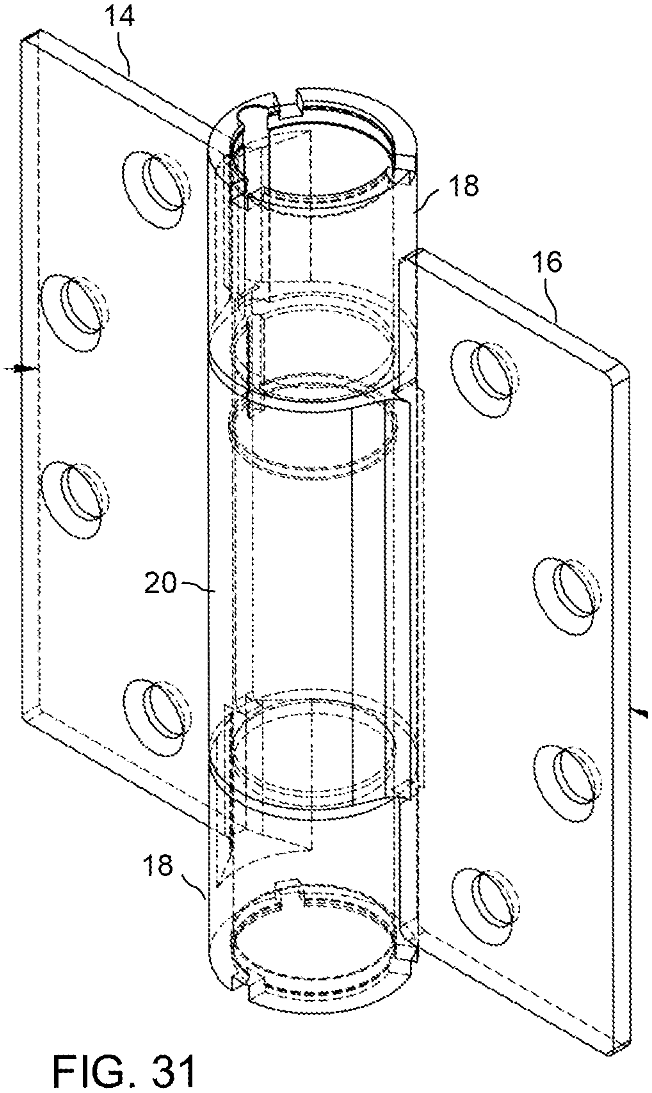
FIG. 31 illustrates a perspective view of an example hinge according to an embodiment of the present technology.
Figure 32:
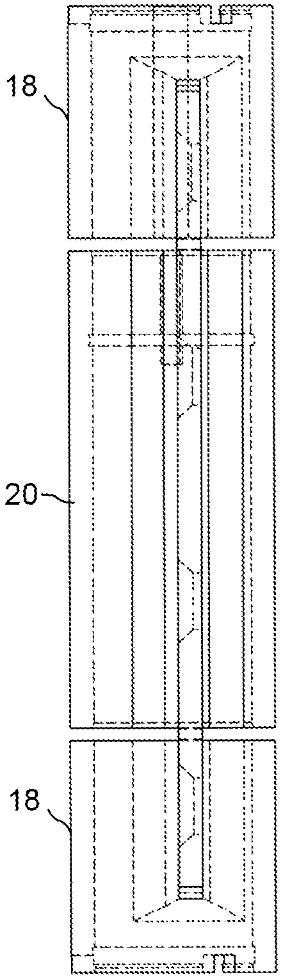
FIG. 32 illustrates a side view of an example hinge according to an embodiment of the present technology.
Figure 34:
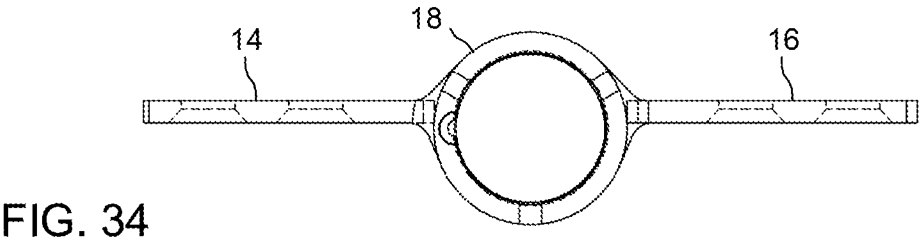
FIGS. 34 and 35 illustrate top and bottom views of an example hinge according to an embodiment of the present technology.
Figure 33:
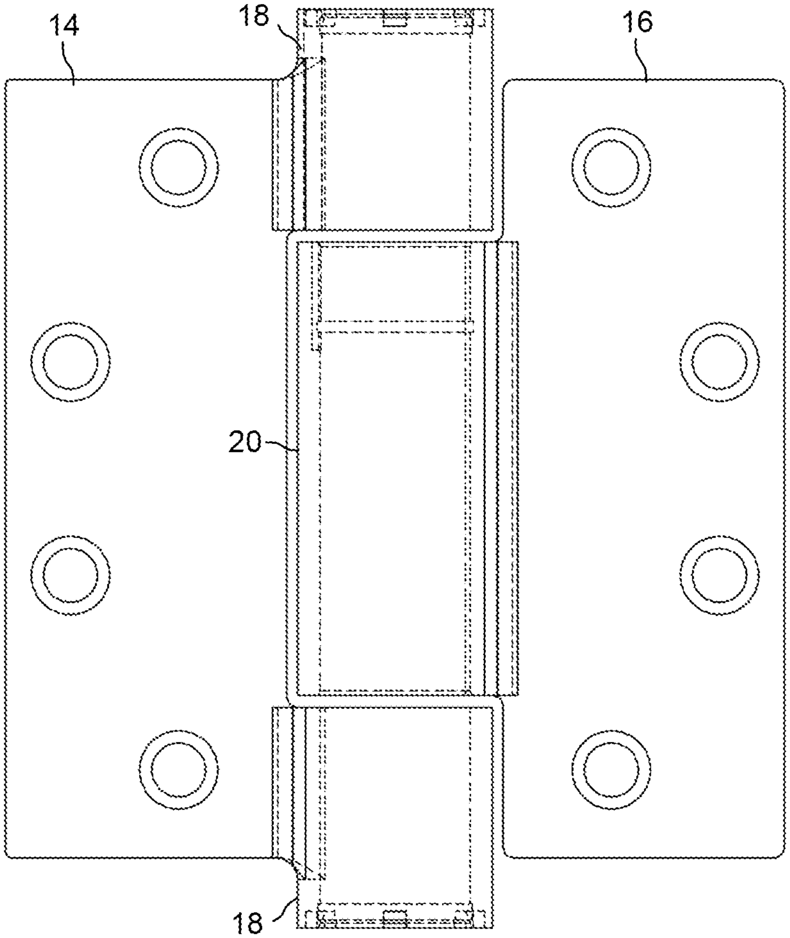
FIG. 33 illustrates a side view of an example door closure system incorporated in a hinge according to an embodiment of the present technology.
Figure 35:
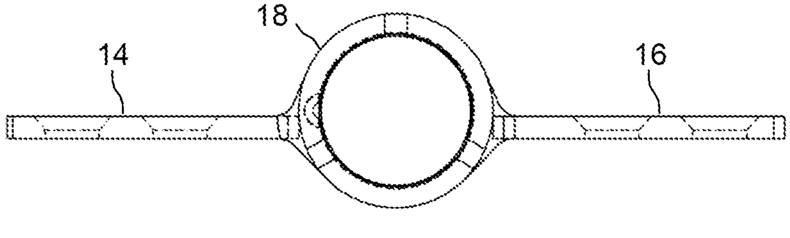

FIGS. 28 to 30 illustrate top, perspective, and bottom views, respectively, of an example door closure system.

FIGS. 31 to 35 illustrate multiple views of the example hinge.

Figure 36:
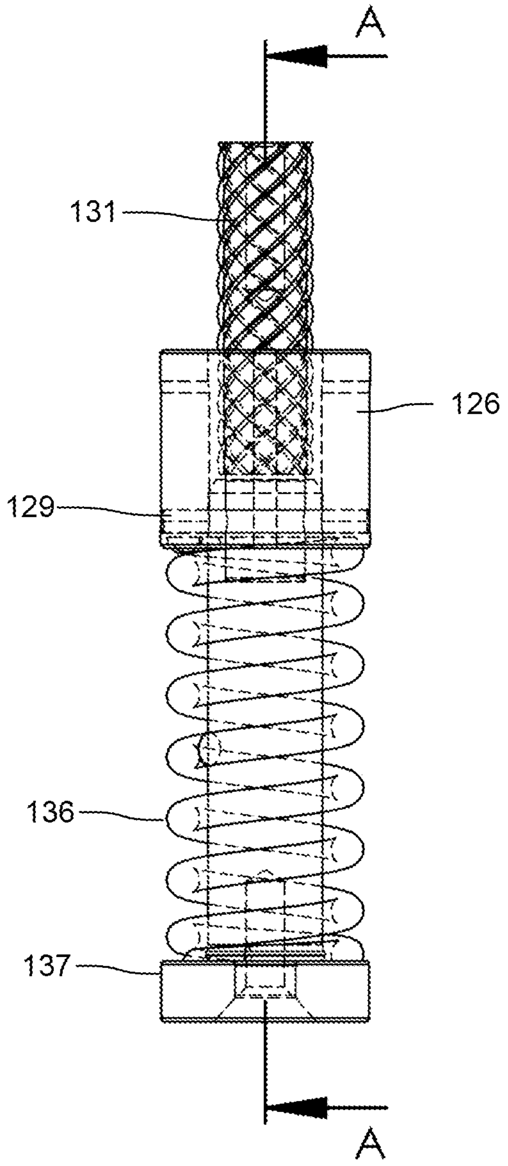
FIG. 36 illustrates a side view of an example piston assembly, lead screw mechanism and plunger bushing with internal mechanics revealed according to an embodiment of the present technology.
Figure 37:
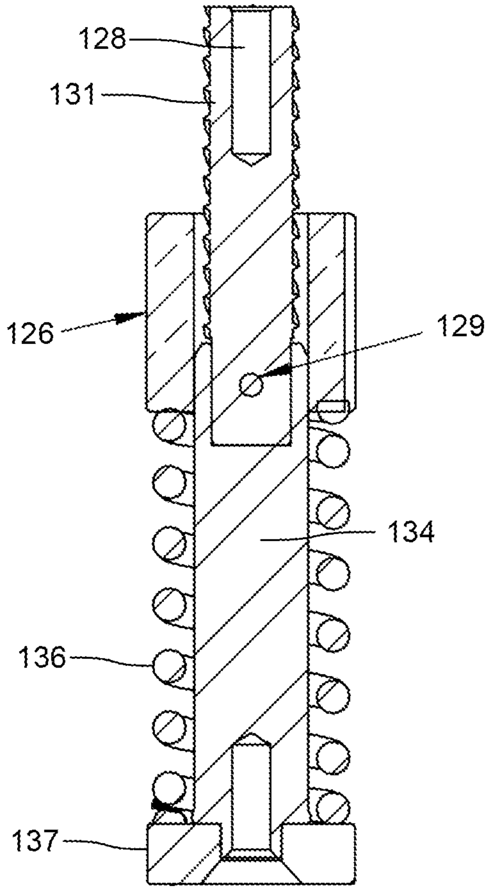
FIG. 37 illustrates a cross-sectional side view of the inner mechanics of an example piston assembly, lead screw mechanism and plunger bushing according to an embodiment of the present technology.

FIG. 36 illustrates a side view of an example piston (e.g., piston 134), lead screw mechanism 131 and plunger bushing 126 with internal mechanics revealed. FIG. 37 illustrates a cross-sectional side view of the inner mechanics of the example piston 134, lead screw mechanism 131 and plunger bushing 126.

Figure 39:
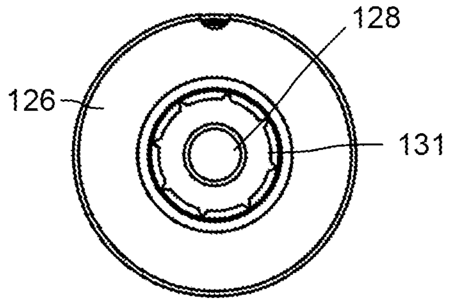
FIGS. 39 and 40 illustrate top and bottom views of an example piston assembly, lead screw mechanism and plunger bushing according to an embodiment of the present technology.
Figure 40:
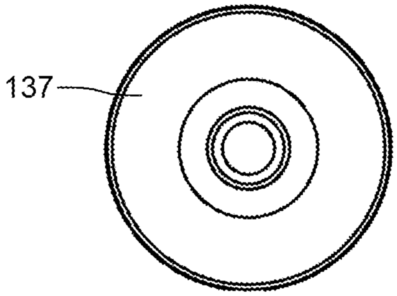

FIG. 38 illustrates a perspective view of the example piston 134, lead screw mechanism 131 and plunger bushing 126, showing slot 166 configured to guide pin 129 therein. FIGS. 39 and 40 illustrate top and bottom views of an example piston assembly, lead screw mechanism and plunger bushing.

Figure 41:
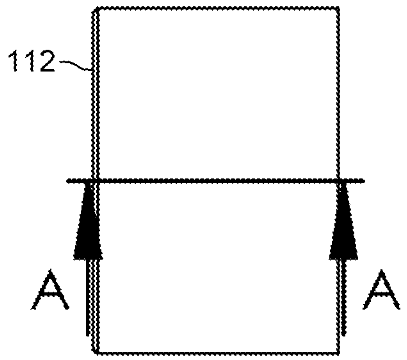
FIG. 41 illustrates a side view of an example cap according to an embodiment of the present technology.
Figure 42:
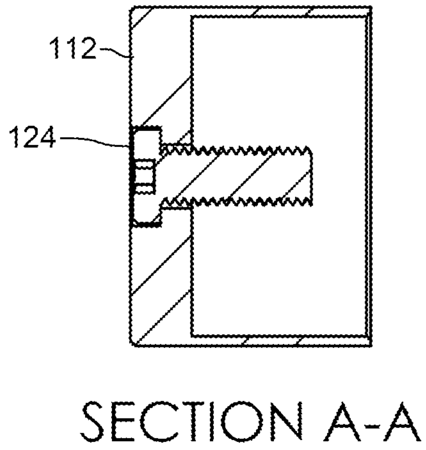
FIG. 42 illustrates a cross-sectional side view of an example cap according to an embodiment of the present technology.
Figure 43:
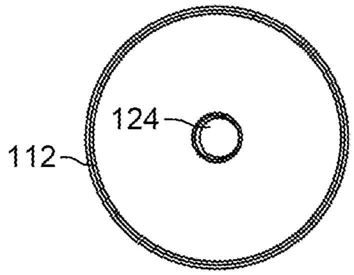
FIGS. 43 to 46 illustrate multiple views of an example cap according to an embodiment of the present technology.
Figure 44:
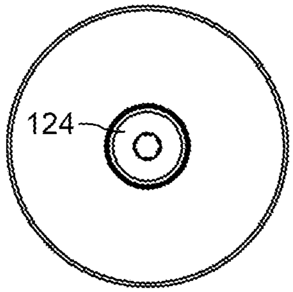
Figure 45:
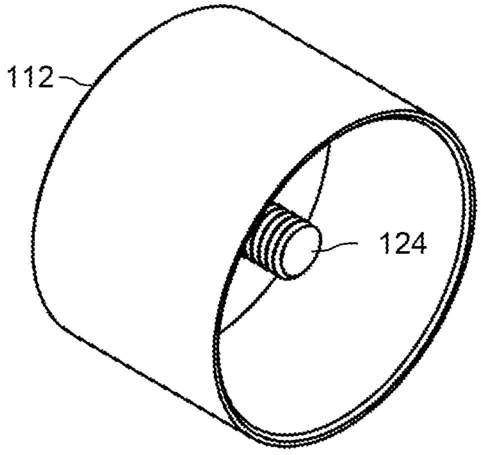
Figure 46:
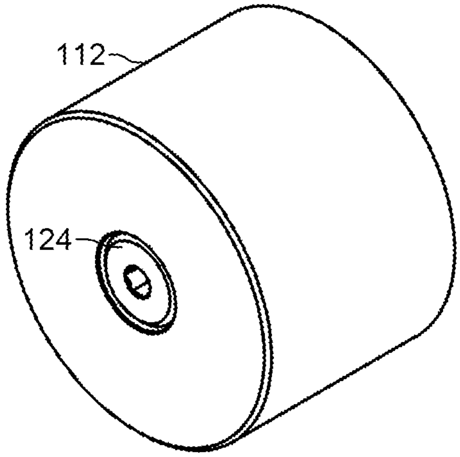

FIGS. 41 to 46 provide multiple views of the cap 112 and screw 124. In particular, FIG. 41 illustrates a side view of the cap 112, FIG. 42 illustrates a cross-sectional side view of the cap 112, FIG. 43 illustrates an inside view of the cap 112, FIG. 44 illustrates a top view of the cap 112, FIG. 45 illustrates a perspective view of the inside of the cap 112, and FIG. 46 illustrates a perspective view of the top of the cap 112.

The Door Closure Control System

FIGS. 47 to 50C illustrate multiple views of an example system and device for adjustable door closure control.

Figure 47:
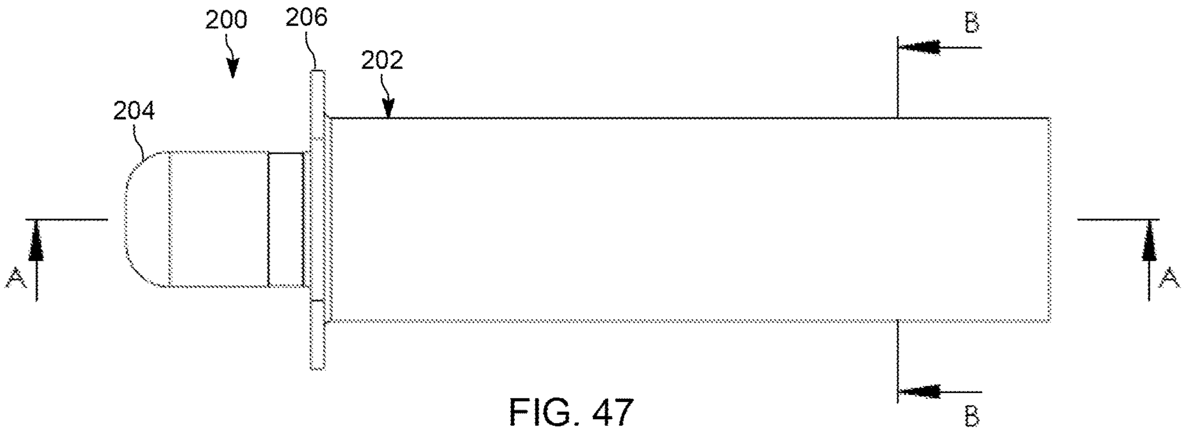
FIGS. 47 to 50C illustrate multiple views of an example closure system according to an embodiment of the present technology.

In some examples of the disclosed system, a door closure control device 200 is defined as generally cylindrical device with a housing 202 configured to receive a movable cap 204, as shown in FIG. 47. A jamb collar or plate 206 can serve as a stop for inserting the device 200 into a door jamb, for example.

Figure 48:
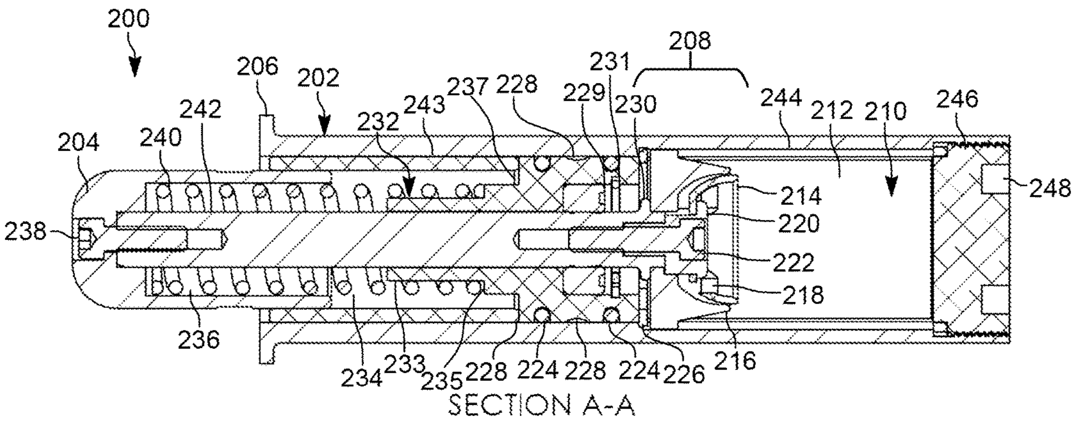

As shown in FIG. 48, the device 200 operates with adjustable valving filled to a specific volume within a channel 212 with a shear thickening fluid (or dilatant fluid) 210, the device 200 being assembled to resist leakage or disassembly. In operation, the device 200 can be inserted into a door jamb or door so that the cap 204 of the device 200 extends from a door jamb or door to receive an impact from a surface moving relative to the cap 204 (such as a door).

A plunger 242 is inserted through a hole in a cap bushing 243 (for example, ¾×⅝×1 inch), which is inserted into the housing 202. The cap bushing 243 is configured to receive the cap 204 in response to an impact. A spring 240 is inserted into a cavity 234 in the cap bushing 243. The plunger cap 204 is secured onto a first end of the plunger 242 by a fastener 238, which is then inserted into the cavity 234, with the spring 240 settling into a cavity 236 of the plunger cap 204.

A piston assembly 208 is arranged on a second end of the plunger 242 opposite the first end, and configured to move into a chamber 212 (and through STF 210) toward an end 246 as the cap 204 is forced into the housing. The piston assembly 208 includes one or more of a piston head 216 and a shim 214. In some examples, the shim 214 and/or the piston head 216 include one or more slots (e.g., slots 218 and 219, respectively, shown in greater detail in FIGS. 53A to 55B), alignment of which determines an amount of resistance on the piston assembly 208 as it moves through the STF 210.

The piston head 216 is placed on the flange side of the plunger 242, and a rebound guide plug 220 is secured to the plunger 242 by a fastener 222 inserted into a hole in the flange end of the plunger 242. The rebound guide plug 220 secures the shim 214 such that the shim 214 can "float" relative to the piston head 216. The piston head 216 and the shim 214 are secured between a stop 230 of the plunger 242 and the rebound guide plug 220. For example, as the piston assembly 208 meets resistance from the STF 210 while being forced toward end 246, the shim 214 may be forced into contact or near contact with the piston head 216, whereas the shim 214 may pull away from the piston head 216 and may engage the guide plug 220 during a reverse motion.

Figure 55A:
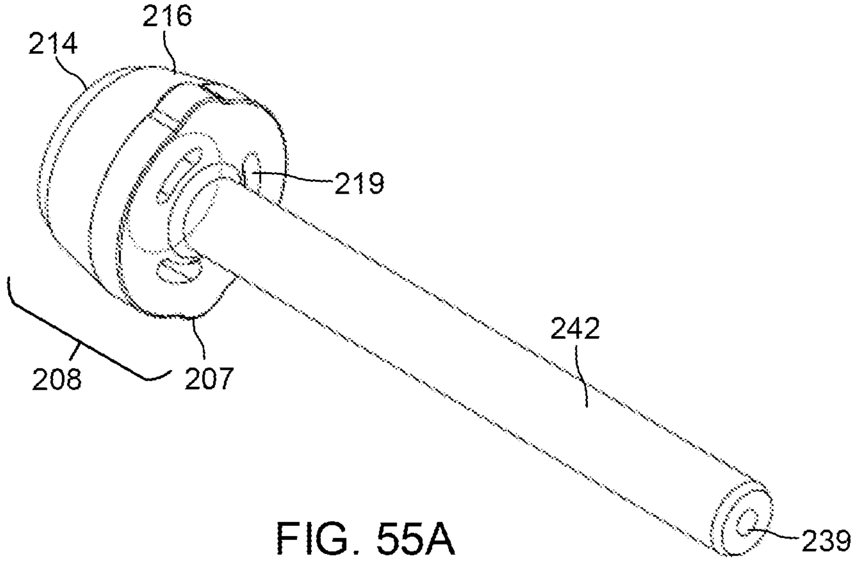
FIG. 55C to 55F illustrate multiple views of an example plunger bushing according to an embodiment of the present technology.
Figure 55B:
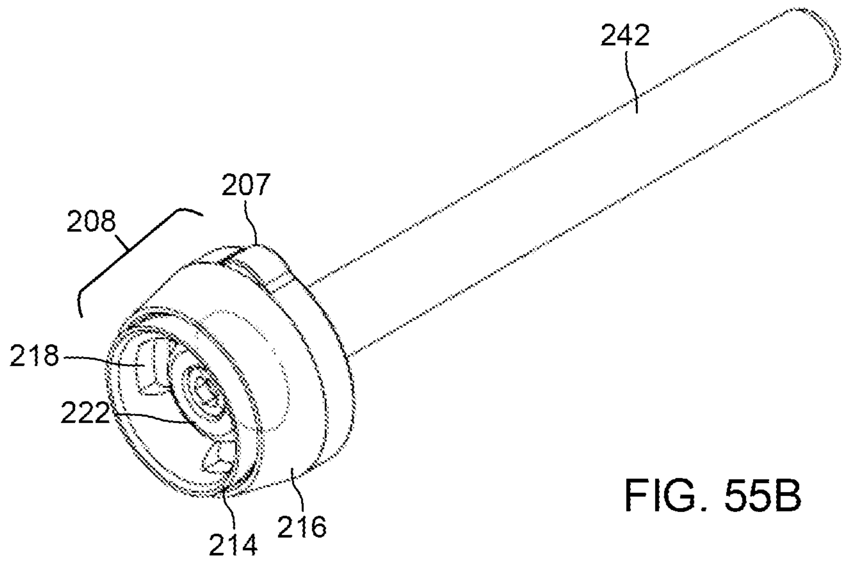
Figure 55C:
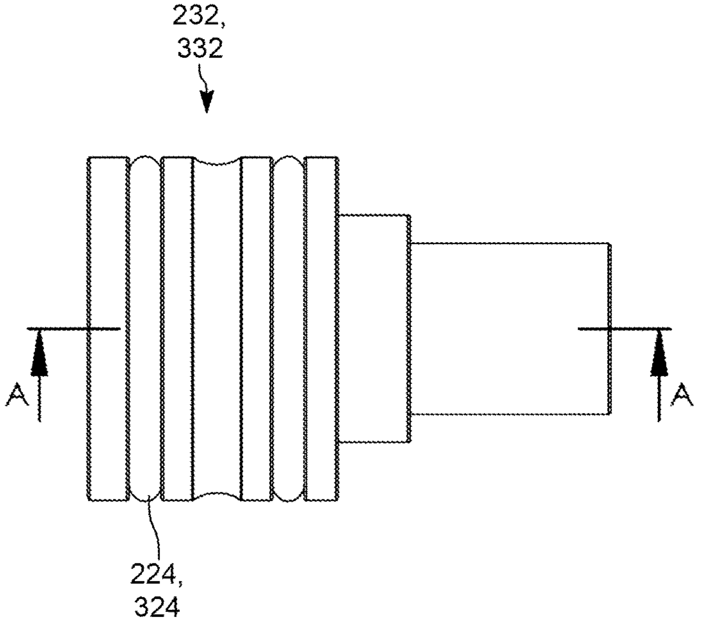
Figure 55D:
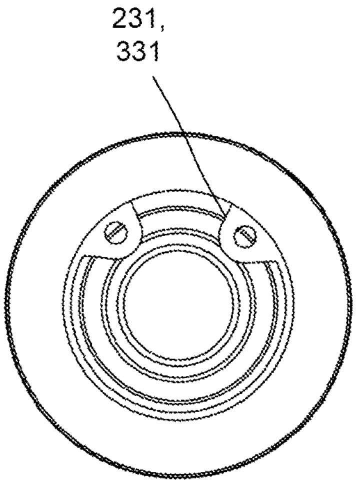
Figure 55E:
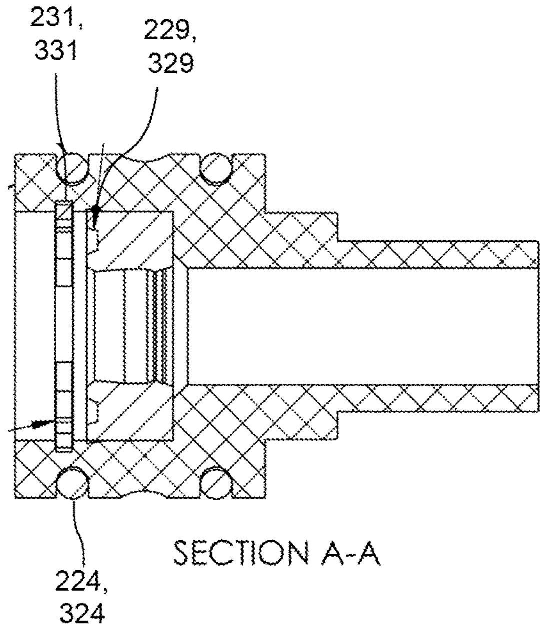
Figure 55F:
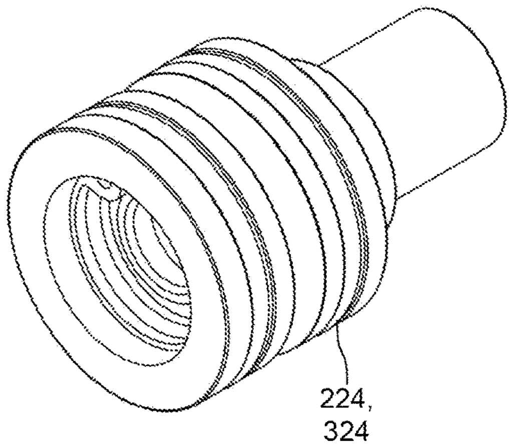

A plunger bushing 232 maintains movement of the plunger 242 along a central axis (coaxial with line A-A of FIG. 47) of the device 200. One or more rails, raised portions, and/or channels 244 are arranged along a portion of an inner surface of the housing 202 to mate with one or more features of the piston assembly 208 (such as the piston head 216), thereby fixing the orientation of the plunger 242 as it moves within the chamber 212. As shown in FIG. 55A, the piston head 216 may include one or more extensions 207 to fit within channels 244 along a length of the chamber 212, thereby maintaining alignment between the piston head 216 and the housing 202 during operation. In some examples, rotation of the cap 204 can cause rotation of the shim 214 relative to the piston head 216. For instance, the cap 204 is connected to the plunger 242, into which the shim 214 is secured. The plunger 242, and the shim 214, are configured to rotate relative to the piston head 216, which is radially aligned with the channels 244. Fixing the radial orientation of the piston head 216 relative to the channels 244 serves to prevent rotation of the cap 204 from causing unintentional rotation of the piston head 216 as well.

The plunger bushing 232 is configured to allow movement of the plunger 242 while preventing outflow of STF 210. For example, one or more hydraulic chamber O-rings 224 are placed between an inner surface of the housing 202 and the plunger bushing 232. One or more U-cup, high-pressure seals 229 are employed to maintain coaxial alignment of the plunger 242 with the central axis. The seal 229 can be retained by an internal snap ring 231, for example. One or more crevices 228 are arranged along various interfaces and configured to accept a small amount of STF 210. For example, once STF 210 enters a crevice 228, it may serve as an additional fluid barrier. As shown, the crevices 228 may be at an edge of a component, such as where plunger bushing 232 and seal 229 meet, and/or along a surface, such as between the plunger bushing 232 and inner walls of the housing 202. In some examples, such crevices can be different sizes, take on different shapes, be continuous about a particular component (e.g., an entire circumference of a generally cylindrical surface), and/or cover a limited portion of a component.

The plunger bushing 232 extends into the chamber 234 and supports the plunger 242 and the spring 240 on a narrow central extension 233 and also provides a surface 235 to receive the spring 240 during compression. The extension 233 serves to support and align the plunger 242 and the spring 240 during linear movement of the cap 204 and the plunger 242. As the cap 204 is forced into the cap bushing 243, edges of the cap 204 surround the extension 233 and stop at another surface 237 of the plunger bushing 232.

The end portion 246 can include one or more fasteners or holes 248 to allow for manual or tooled removal of the end portion 246. This exposes the interior of the chamber 212, allowing for maintenance on and/or removal of the components therein.

Once assembled, the device 200 can be lightly hammered into a drilled hole in the jamb side of the door or an edge of the door, such as by employing an install guide. For instance, the cap 204 extends from the door jamb such that the edge of the closing door impacts the cap 204, thereby forcing the plunger 242 into the chamber 212, where the piston assembly 208 meets resistance from the STF 210. At installation of the device 200, a user can adjust the resistance as desired by turning cap 204 clockwise or counter-clockwise or in between as desired to control door closure and react to the speed and pressure of a closure. In some examples, turning the cap 204 counter-clockwise aligns the slots 218 and 219, whereas turning the cap 204 clockwise misaligns the slots. At lower speeds and pressures, the closing door meets less resistance from the device 200 and the door closes easily, whereas at higher speeds and pressures the STF 210 of the device 200 stiffens up and controls the slam.

Figure 49A:
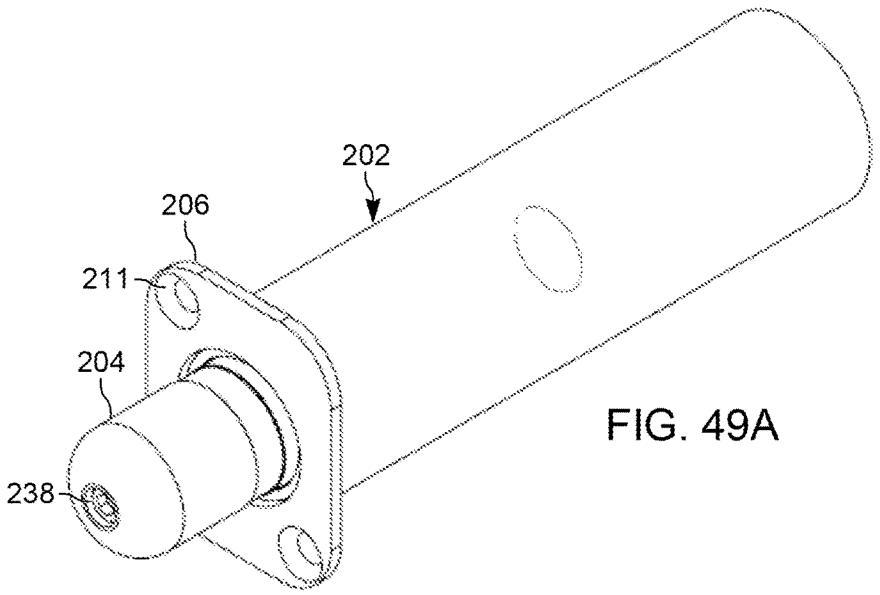
Figure 49B:
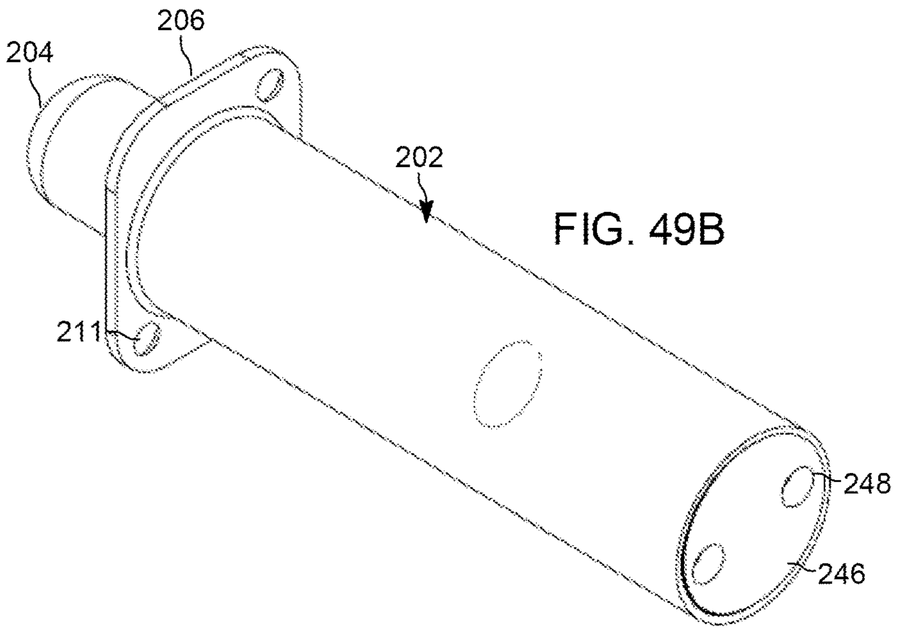
Figure 50A:
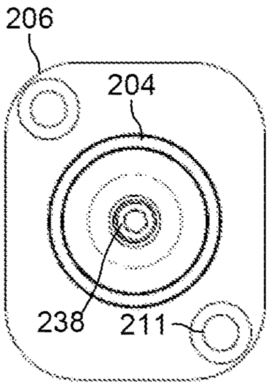
Figure 50B:
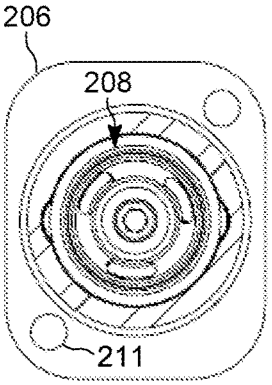
Figure 50C:
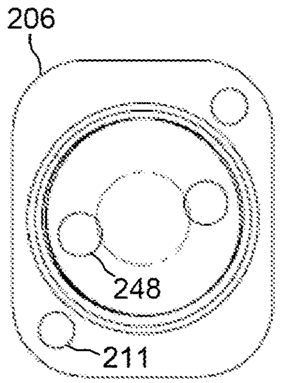

FIGS. 49A and 49B show perspective views of the device 200, with one or more holes or other fasteners 211 in jamb plate 206. FIGS. 50A, 50B and 50C show front, middle (along lines B-B of FIG. 48B), and end views of the device 200, respectively.

Figure 51A:
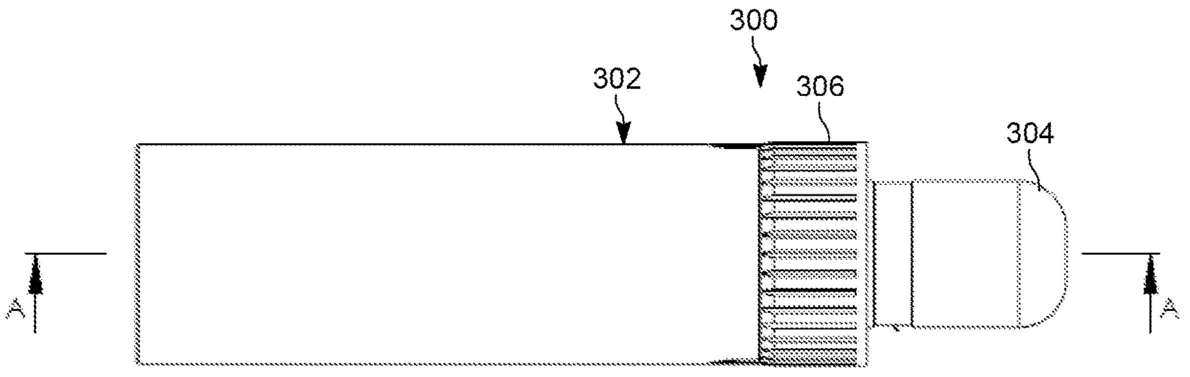
FIGS. 51A to 52C illustrate multiple views of another example closure system according to an embodiment of the present technology.

FIGS. 51A to 52C illustrate multiple views of another example closure control device 300. As shown in FIG. 51A, the device 300 includes a housing 302, a cap 304, and a jamb collar 306. FIG. 51B provides a cross-sectional view of the device 200. The device 300 has some features and/or components similar to the device 200.

For example, the door closure control device 300 is defined as generally cylindrical device with a housing 202 configured to receive a movable cap 304, as shown in FIG. 51A. A jamb collar or plate 306 can serve as a stop for inserting the device 300 into a door jamb or door edge, for example.

Figure 51B:
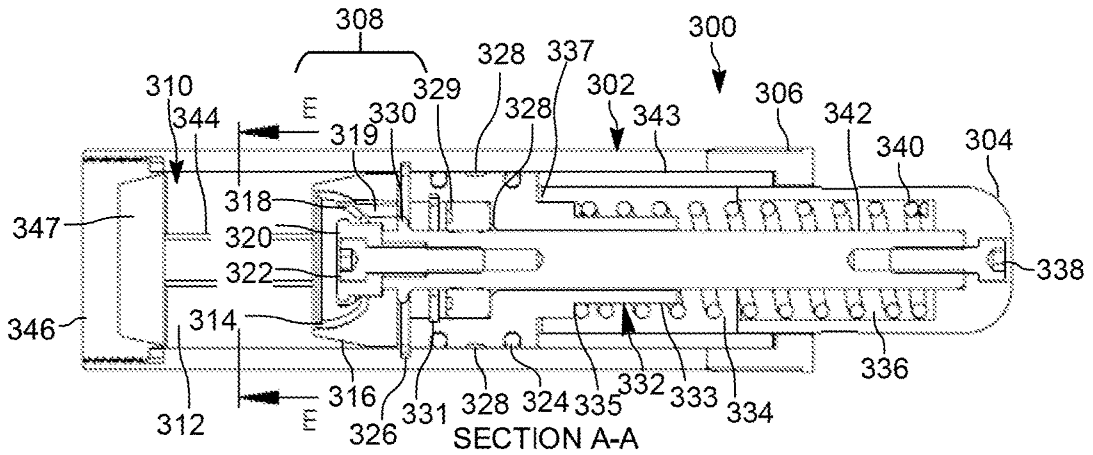

As shown in FIG. 51B, the device 300 operates with adjustable valving filled to a specific volume within a channel 312 with a shear thickening fluid (or dilatant fluid) 310, the device 300 being assembled to resist leakage or disassembly. In operation, the cap 304 of the device 300 extends from a door jamb or door edge to receive an impact from a surface moving relative to the cap 304 (such as a door).

A plunger 342 is inserted through a hole in a cap bushing 343 (for example, ¾×⅝×1 inch), which is inserted into the housing 302. The cap bushing 343 is configured to receive the plunger cap 304 in response to an impact. A spring 340 is inserted into a cavity 334 in the plunger bushing 343. The plunger cap 304 is secured onto a first end of the plunger 342 by a fastener 338, which is then inserted into the cavity 334, with the spring 340 settling into a cavity 336 of the plunger cap 304.

A piston assembly 308 is arranged on a second end of the plunger 342 opposite the first end, and configured to move into a chamber 312 (and through STF 310) toward an end 346 as the cap 304 is forced into the housing. The piston assembly includes one or more of a piston head 316 and shim 314. In some examples, the shim 314 and/or the piston head 316 include one or more slots 318 and 319, respectively, alignment of which determines an amount of resistance on the piston assembly 308 as it moves through the STF 310. The shim 314, the piston head 315, and slots 318 and 319 are similar to the shim 214, the piston head 215, and slots 318 and 319 represented in FIGS. 54A-55B.

The piston head 316 is placed on the flange side of the plunger 342, and a rebound guide plug 320 is secured to the plunger 342 by a fastener 322 inserted into a hole in the flange end of the plunger 342. The rebound guide plug 320 secures the shim 314 such that the shim 314 can "float" relative to the piston head 316. The piston head 316 and the shim 314 are secured between a stop 330 of the plunger 342 and the rebound guide plug 320. For example, as the piston assembly 308 meets resistance from the STF 310 while being forced toward end 346, the shim 314 may be forced into contact or near contact with the piston head 316, whereas the shim 314 may pull away from the piston head 316 and may engage the plug 320 during a reverse motion.

A plunger bushing 332 maintains movement of the plunger 342 along a central axis (coaxial with line A-A of FIG. 51A) of the device 300. One or more rails, raised portions, and/or channels 344 are arranged along a portion of an inner surface of the housing 302 to mate with one or more features of the piston assembly 308 (such as the piston head 316), thereby fixing the radial orientation of the plunger 342 as it moves within the chamber 312. Similar to piston head 216, the piston head 316 may include one or more extensions to fit within channels 344 along a length of the chamber 312, thereby maintaining radial alignment between the piston head 316 and the housing 302 during operation. In some examples, rotation of the cap 304 can cause rotation of the shim 314 relative to the piston head 316. As shown in FIG. 51B, the shim 314 is secured to the plunger 342 by the rebound guide plug 320 via fastener 322. Cap 304 is fixed to the piston 342 via a screw 338, such that rotation of the cap 304 causes the shim 314 to turn relative to the piston head 316, thereby adjusting alignment between slots 318 and 319 of the shim 314 and piston head 316. This in turn adjusts the amount of overlap between the slots, adjusting a size of a channel formed by the slots and adjusting the ease by which the STF 310 flows through the channel during movement of the piston assembly 308. Fixing the radial orientation of the piston head 316 relative to the channels 344 serves to prevent rotation of the cap 304 from causing unintentional rotation of the piston head 316 during rotation of the cap 304 and/or shim 314 as well.

The plunger bushing 332 is configured to allow movement of the plunger 342 while preventing outflow of STF 310. For example, one or more hydraulic chamber O-rings 324 are placed between an inner surface of the housing 302 and the plunger bushing 332. One or more U-cupped, high-pressure seals 329 are employed to maintain alignment of the plunger 342. The seal 329 can be retained by an internal snap ring 331, for example. One or more crevices 328 are arranged along various interfaces and configured to accept a small amount of STF 310. For example, once STF 310 enters a crevice 328, it may serve as an additional fluid barrier. As shown, the crevices 328 may be at an edge of a component, such as where the plunger bushing 332 and seals 329 meet, and/or along a surface, such as between the plunger bushing 332 and inner walls of the housing 302. In some examples, such crevices can be different sizes, take on different shapes, be continuous about a particular component (e.g., an entire circumference of a generally cylindrical surface), and/or cover a limited portion of a component.

The plunger bushing 332 extends into the chamber 334 and supports the spring 340 on a narrow central extension 333 and also provides a surface 335 to receive the spring 340 during compression. The extension 333 serves to support and align the plunger 342 and the spring 340 during linear movement of the cap 304 and the plunger 342. As the cap 304 is forced into the cap bushing 343, edges of the cap surround the extension 333 and stop at another surface 337 of the plunger bushing 332.

Figure 52A:
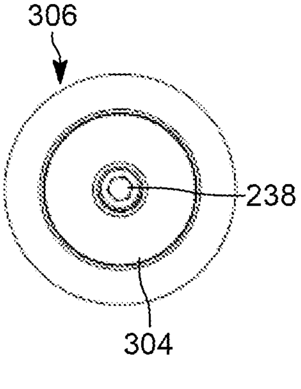
Figure 52B:
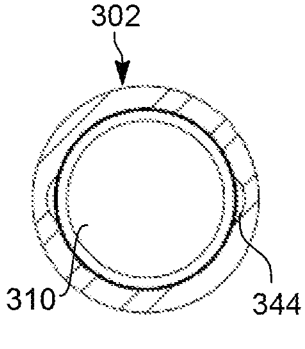
Figure 52C:
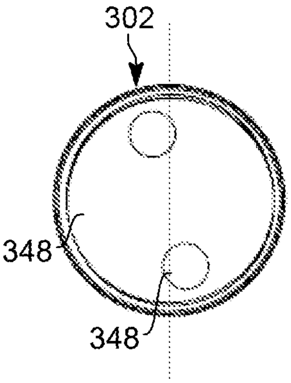

The end portion 346 can include one or more fasteners or holes 348 (as shown in FIG. 52C) to allow for manual or tooled removal of the end portion 346. This exposes the interior of the chamber 312, allowing for maintenance on and/or removal of the components therein. In some examples, the end portion 346 can include a void 347 dimensioned to accept a portion of the piston assembly 308. For instance, the void 347 has angled ends to mate with sloped sides of the piston head 316.

Figure 51C:
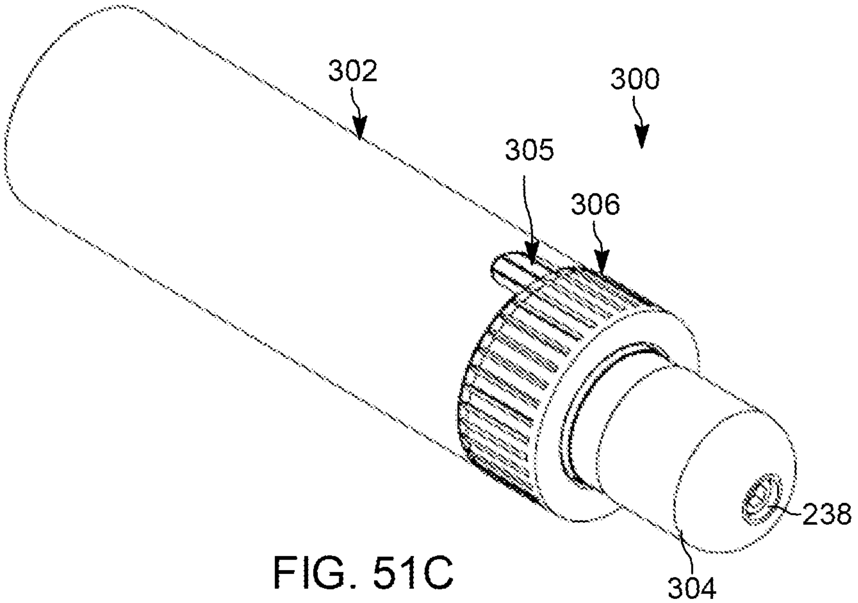

In some examples, the device 300 includes an indicator (e.g. visual, audible, tactile, etc.) that provides information regarding alignment of the slots of the shim and the slots of the piston head. FIG. 51C shows a perspective view of the device 300, with one or more markers 305 to indicate an amount of resistance based on rotational movement of the cap 304 and/or the jamb collar 306. For instance, one or more markers (e.g. lines, letters, numbers, graphics, colors, etc.) may be provided on the knob and/or a portion of the system to indicate an amount of resistance and/or alignment of the slots. FIGS. 52A, 52B and 52C show front, middle (along lines E-E of FIG. 51B), and end views of the device 300, respectively.

FIGS. 53A to 55B illustrate multiple views of an example piston and/or piston assembly for the example closure systems of FIGS. 47 to 52C. For instance, although the numbering of features references the device 200, the description is generally applicable to both devices 200 and 300.

Figure 53A:
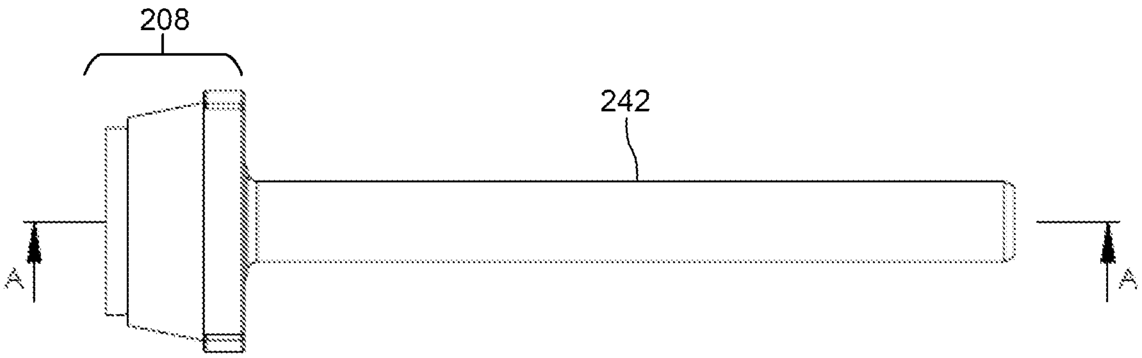
FIGS. 53A to 55B illustrate multiple views of an example piston assembly for the example closure systems of FIGS. 47 to 52C according to an embodiment of the present technology.
Figure 53B:
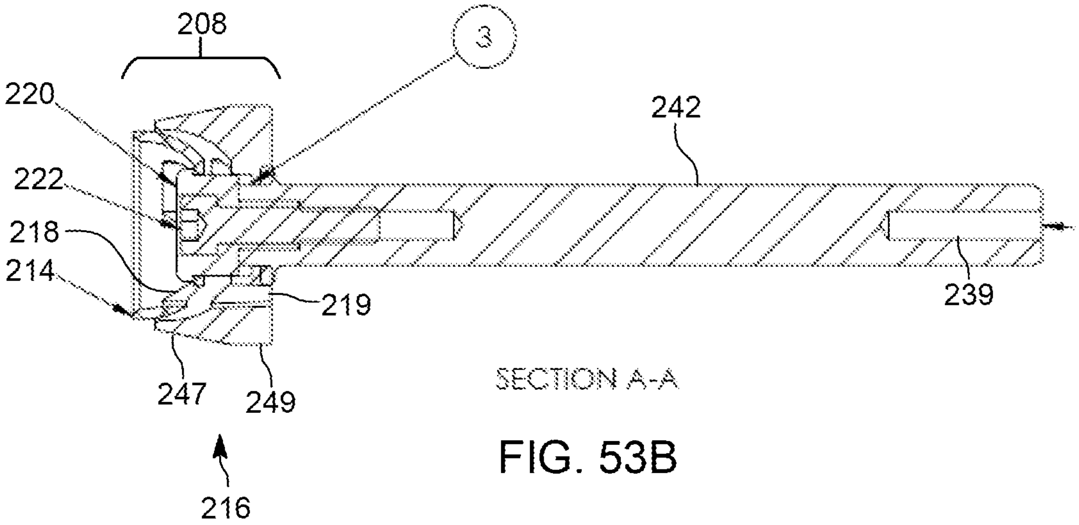
Figure 54A:
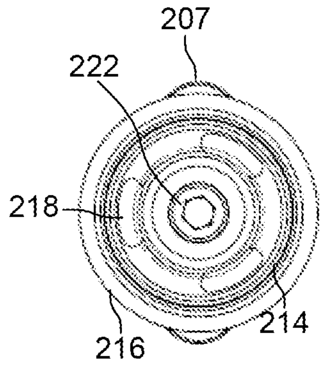
Figure 54B:
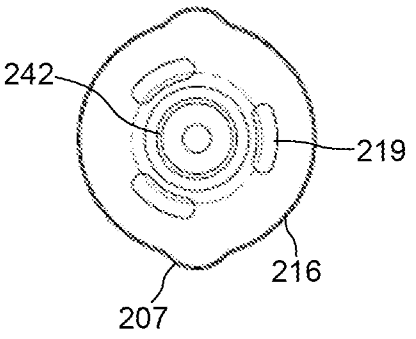

In the example of FIG. 53B, the piston head 216 is shaped with an angled first portion 247 and a substantially cylindrical second portion 249. For instance, the second portion 249 may make contact with an inner wall of the chamber 212 or 312 during movement of the plunger assembly 208. This substantially prevents STF 210 or 310 flowing between the second portion 249 and the inner wall, concentrating any flow of STF 210 or 310 between slots 218 and 219 of the shim 214 and piston head 216, respectively. A hole 239 is arranged at an end of the plunger 242 to receive the fastener 238 or 338.

FIGS. 54A to 55B illustrate multiple views of an example piston and/or piston assembly for the example closure devices 200, 300. As shown, one or more extensions 207 can be arranged at an outer circumference of the piston head 216, such as on second portion 249.

FIGS. 55C to 55F provide multiple views of a plunger bushing, such as plunger bushing 232 and/or 332 (as shown in example FIGS. 47 and 51B, respectively).

The Hinge Door Closure Control System

Turning to FIGS. 56A to 59B, a hinge system 400 incorporated in a hinge that controls the motion of one or more devices, such as the slamming of a door, is shown.

Figure 56A:
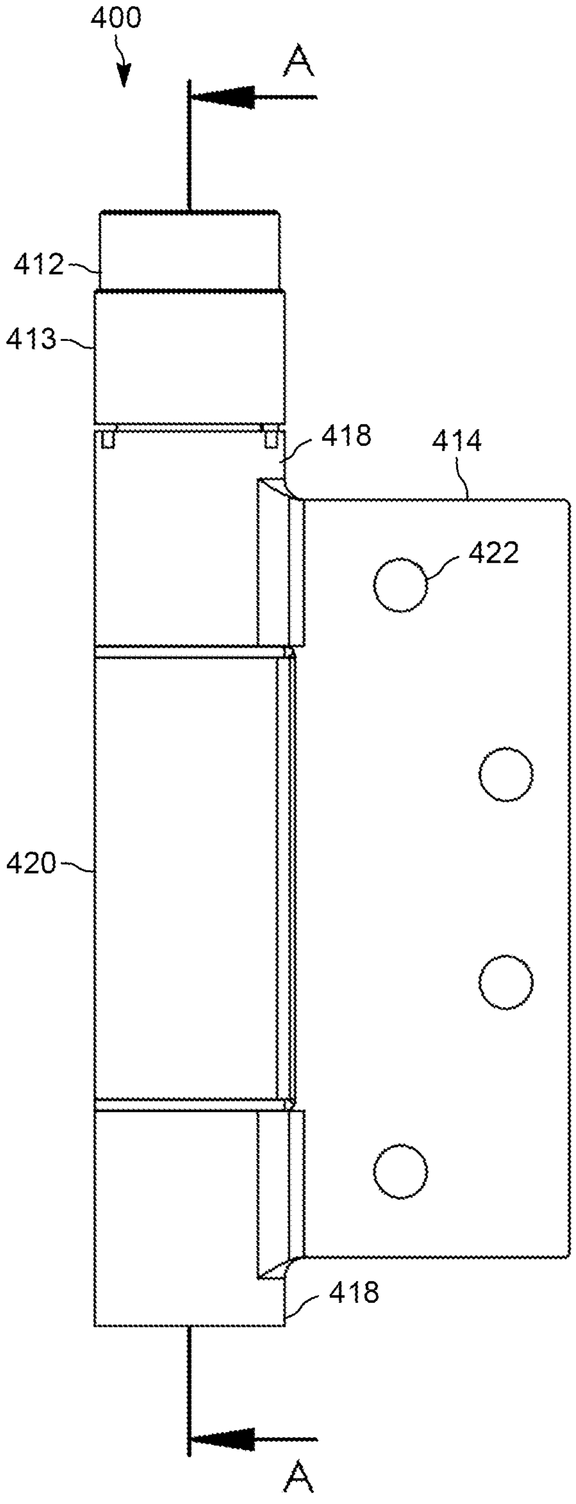
FIG. 56A to 59B illustrate multiple views of an example hinge system incorporated in a hinge according to an embodiment of the present technology.

The hinge system 400 is configured to replace one or more hinges of a door. As shown in FIG. 56A, a complete hinge assembly (with the system 400 incorporated through hinge leaves 414 and 416, as shown in FIG. 56C) performs a similar function as the hinge system 10 described above by controlling the closure speed of a door and/or stopping fast or forceful movements with a combination of STF resistance combined with the mechanicals disclosed herein. Users can replace one or more of their existing door hinges to have the control they desire.

The disclosed hinge system 400 can be provided in right hand and left-hand versions and can be a complete assembly for the user to install. In other words, no assembly is required by the user, just installation. For example, a first leaf 414 is attached to the door and a second leaf 416 is attached to the jamb of the door. The leaves 414 and 416 include holes 422 for receiving fasteners that connect the leaves 414 and 416 to the door or jamb. In some examples, safety tabs may be included to prevent the leaves of the hinge from being removed from the door or the door jamb (e.g., when the respective knuckle is external), preventing removal of mounting screws or tampering with the door closer.

Figure 56B:
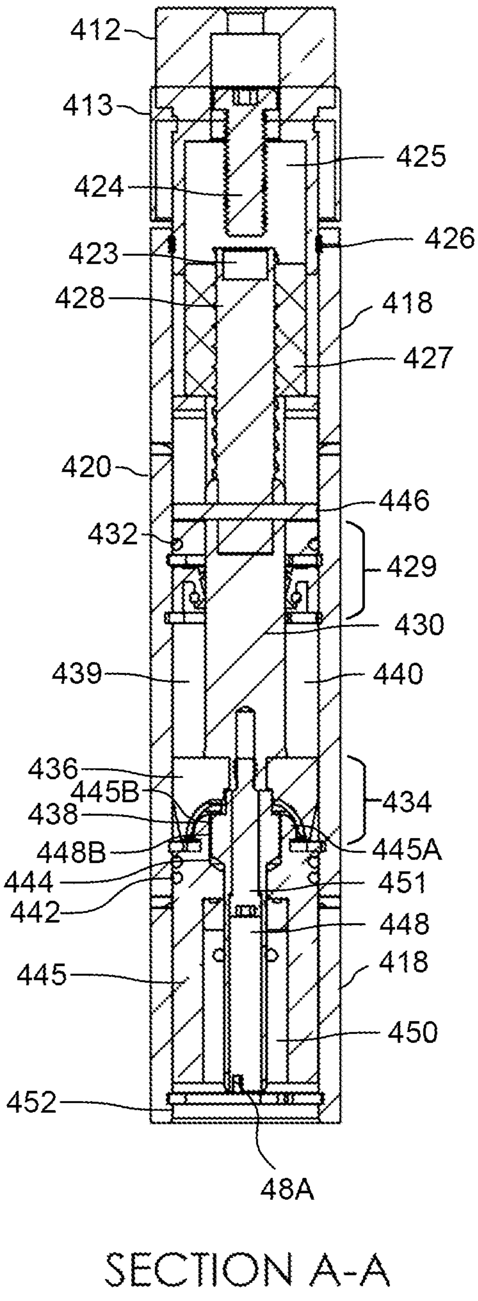
Figure 56C:
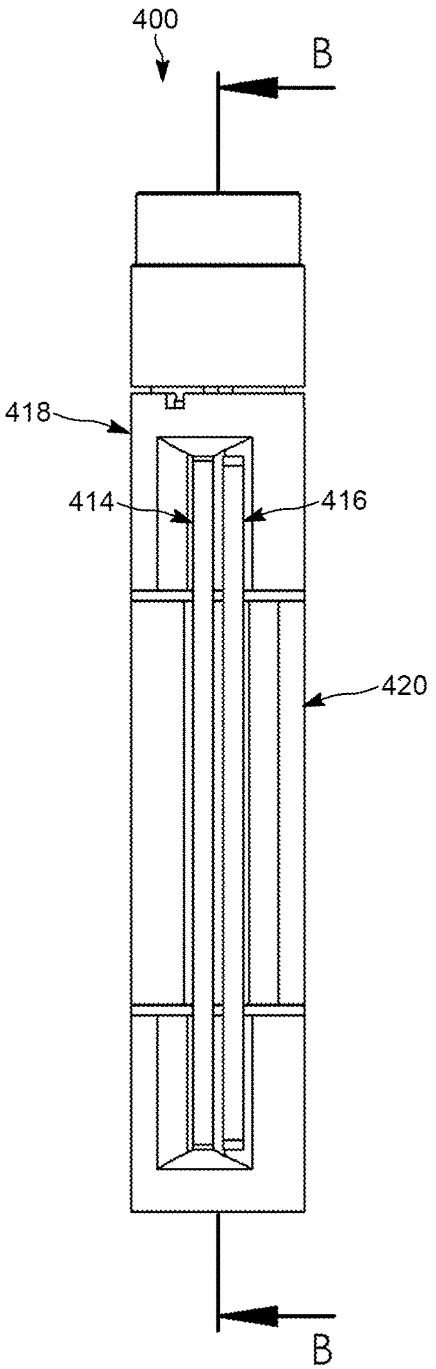

With reference to FIG. 56B, the hinge system 400 turns the rotary motion of the hinge into linear motion using a lead screw mechanism 428 combined with a mating lead screw nut 427 to drive a plunger rod 430 which drives a piston assembly 434 (including a piston head 436 and/or a rebound shim 438) though the STF 440 as the door is closed. The mating nut 427 is held stationary within a knuckle 418 of second leaf 414. A plunger bushing 429 serves the dual purpose of maintaining the concentric position of the plunger rod 430 and sealing an STF chamber 439 area within a chamber housing formed by knuckle 420 of first leaf 416. The seal between the plunger bushing 429 and the interior walls of the chamber 439 is accomplished by O-rings 432, and plunger bushing 429 can be retained in place by one or more retaining rings.

The lead screw mechanism 428 and the plunger bushing 429 are in the same rotational position in relation to each other while allowing the lead screw mechanism 428 to travel vertically with the rotation of the hinge. The mating lead screw nut 427 does not move up or down. The lead screw mechanism 428 moves up and down relative to the mating lead screw nut 427. An internal space or counter bore 423 of the lead screw mechanism 428 allows for the lead screw mechanism 428 to rise into space 425 as the door is opened, and allows the screw 424 to be inserted into the counter bore 423. The lead screw mechanism 428 and the plunger rod 430 are held in the same rotational position relative to each other, such as by use of a dowel pin 446. Such a dowel pin effectively drives the plunger rod 430 since it is connected to both the lead screw mechanism 428 and the plunger rod 430.

In operation, when the hinge leaf 414 is rotated from open to closed, the mating lead screw nut 427, which is secured to the knuckle 420, rotates with respect to the hinge leaf 416. As the mating lead screw nut 427 rotates, it causes the lead screw mechanism 428, which is connected to the plunger bushing 429 by the pin 446, to start rotating downward away from mating lead screw nut 427 and cap 412. As the lead screw mechanism 428 rotates downward, the pin 446 slides downward in one or more slots in the plunger bushing 429. As the position of bushing 429 is fixed relative to knuckle 20, the relative rotational movement between hinge leaves 414 and 416 forces linear movement of lead screw mechanism 428. For example, the rotational movement between hinge leaves 414 and 416 forces the lead screw mechanism 428 to rotate within mating lead screw nut 427, thereby causing the linear motion of the lead screw mechanism 428 and the connected plunger assembly 434, as disclosed herein.

Because the plunger rod 430 is connected to the lead screw mechanism 428 by the pin 446, the plunger rod 430 moves downward with the lead screw mechanism 428, which causes the shim 438 and piston head assembly 434 to push into the STF 440 in the chamber 439. The STF 440 reacts to the engagement from the shim 438 and piston head assembly 434 as previously described depending on how the slots on the shim 438 are aligned with the slots on the piston head assembly 434 (FIGS. 58A-59B). In this way, the STF 440 controls the rotary motion of the hinge leaf 416 when the hinge leaf 416 is closed. Upon opening the door, hinge leaf 416 is rotated away from hinge leaf 414 and the lead screw mechanism 428 screws back up toward the mating lead screw nut 427 and cap 412. As the lead screw mechanism 428 screws upward, the plunger rod 430, which is connected to the lead screw mechanism 428, moves upward as well.

With references to FIG. 56B, a bolt 448 is connected to the plunger rod 430 and extends therefrom into a chamber 450 of a shaft housing 445. The piston 436 is mounted to the plunger rod 430 and the shim 438 is mounted to the bolt 448. For instance, the shim 438 has some space for limited axial movement between the bolt 448 and the piston 436. The bolt 448 is configured to receive, for example, a tool or complementary bolt (not shown) within slot 48A to rotate the bolt 448, thereby rotating the shim 438 relative to the piston 436. Rotation of the shim 438 adjusts alignment between shim slots and piston slots to control flow of STF 440 during movement of the plunger 430 (shown in detail in FIGS. 57B-59B). The chamber 450 allows space for the bolt 448 to move up and down with movement of the plunger 430.

The bolt 448 screws into the plunger rod 430 via screw 451, thereby securing the piston head 436 and the shim 438 to the plunger rod 430. The bolt 448 can rotate with respect to the screw 451 and the shim 438 is arranged at an interface between the bolt 448 and the piston head 436 such that rotation of the bolt 448 can adjust alignment of the shim 438 relative to the piston head 436. The rebound shim 438 is allowed to move up and down along the bolt 448 relative to the piston head 436 during opening or closing of the door. One or more O-rings 442 provide a seal between the shaft housing 445 and the chamber 439.

In some examples, rotating the bolt 448 to turn the shim 438 can be limited by a block, stop, lip portion and/or protrusion 441. The protrusion 441 may be located on the bolt 448, the shim 438, the piston 436, the plunger 430, and/or an internal surface of the hinges. The protrusion 441 can be connected and oriented such that the blocking of further rotation of the bolt 448 and shim 438 in a first direction by the protrusion 441 can indicate to the user that the slots of the shim and the slots of the piston head are aligned, and that the blocking of further rotation of the bolt 448 and shim 438 in a second, opposite direction by the protrusion can indicate to the user that the slots of the shim and the slots of the piston head are not aligned.

In examples, a portion 445A of the shaft housing 445 extends into the chamber 450. The portion 445A is defined by an outer wall designed to mate with an internal space of the shim 438, such that, when the door is open, the shim 438 envelopes the outer wall of the portion 445A. An internal space 445B of the portion 445A is designed to receive an expanded portion 48B of the bolt 448. Therefore, when the hinge is open and the plunger 430 extends into the chamber 450 and the bolt 448 extends into chamber 450, the shim 438 mates with portion 445A, and the expanded portion 48B of the bolt 448 mates with internal space 445B. This may result in physical contact between components, and/or result in an amount of STF 440 between surfaces.

The cap 412 is configured to turn a screw 424 to adjust an amount of distance the screw 428 can move vertically into space 425. The cap 412 covers the upper hinge pin 413 that has a tapped hole. The cap 412 can be screwed into upper pin 413 to set the hinge stopping position. For instance, as the cap 412 is screwed in, the screw 424 enters into a counter bore 423 in the top side of screw 428, limiting vertical movement of the screw 428 to yield a desired door position and/or closure speed.

In some examples, the end portion 452 can be removed or, in some examples, provide access to the bolt 448. Rotation of the bolt 448 controls alignment of the shim 438 and the piston head 436, thereby adjusting the flow rate of the STF 440 (such as that described above with respect to the linear motion control device) through piston slots 419 (FIG. 58A) and through shim slots 460 (FIG. 59B). The operation is similar to that described above for the linear motion control device. In particular, the fluid flow is controlled by rotating the bolt 448. The bolt 448 includes a D- or C-shaped extension that can mate with a tool equipped with a D- or C-shaped extension. The mating of the extension and the tool allows the rotation of the bolt 448 to turn the rebound shim 438 relative to the piston head 436 to adjust alignment of the slots 419 and 460 to control STF flow.

Figure 56D:
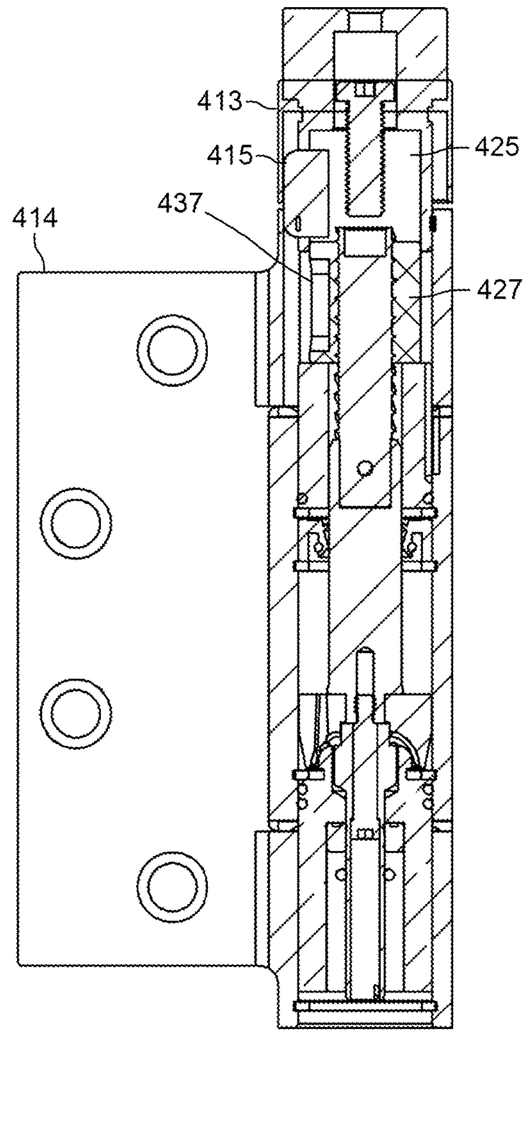

FIG. 56C illustrates a side view of the hinge and hinge assembly, with FIG. 56D showing a cross-section of the hinge and hinge assembly. As shown in FIG. 56D, nut 427 includes a space 437. The nut 427 is part of the upper hinge pin. An element 415 is arranged between the knuckle 420 and upper hinge pin 413 to key the upper hinge pin 413 to the knuckle 418 of hinge leaf 414.

Figure 57A:
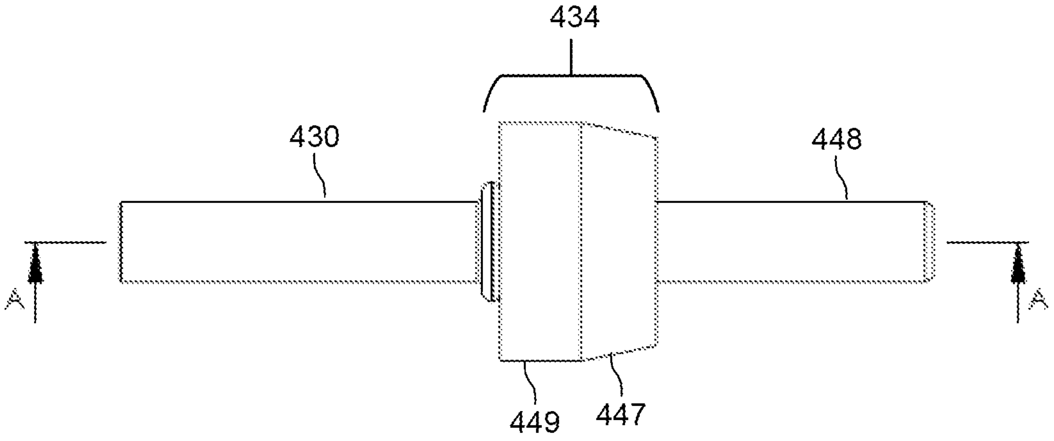
Figure 57B:
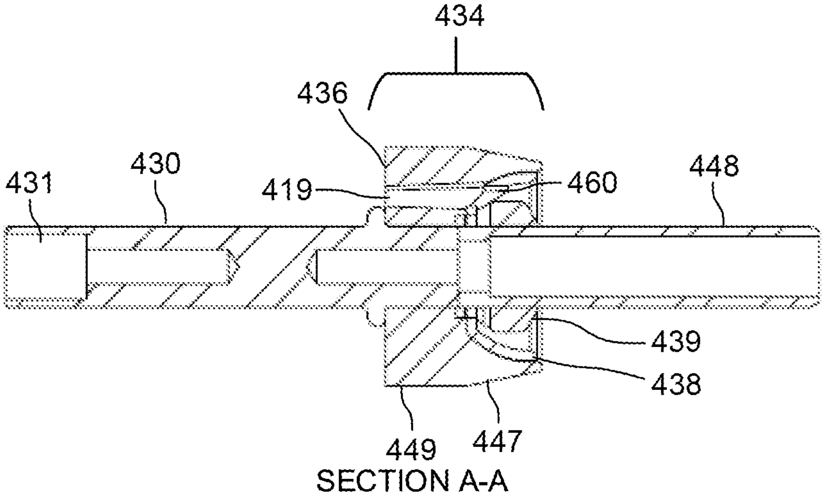

FIGS. 57A to 59B illustrate multiple views of the piston assembly 434. For example, FIGS. 57A and 57B show the piston head 436 is shaped with an angled first portion 447 and a substantially cylindrical second portion 449. For instance, the second portion 449 may make contact with an inner wall of the chamber 439 during movement of the plunger assembly 434. This substantially prevents STF 440 flowing between the second portion 449 and the inner wall, concentrating any flow of STF 440 between slots 460 and 419 of the shim 438 and the piston head 436, respectively. A hole 431 is arranged at an end of the plunger rod 430 to receive the screw mechanism 428.

Figure 58A:
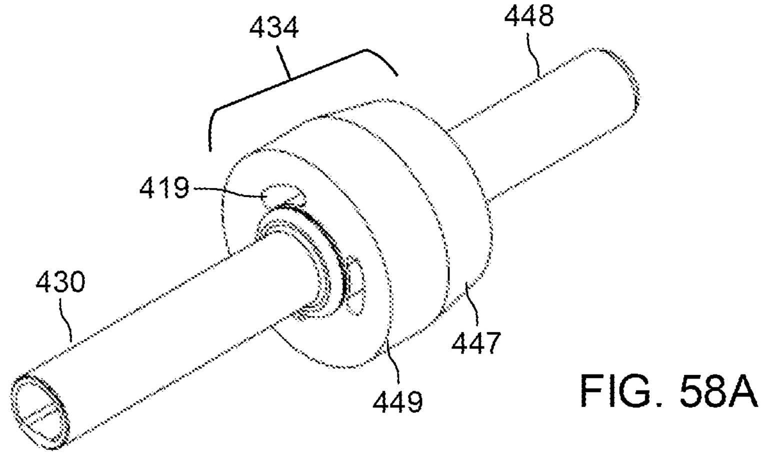
Figure 58B:
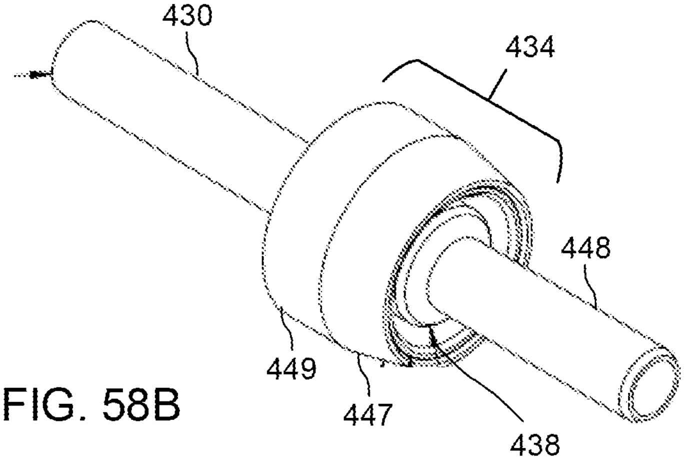
Figure 59A:
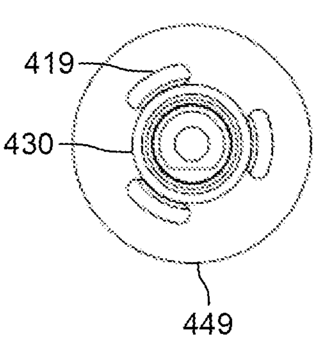
Figure 59B:
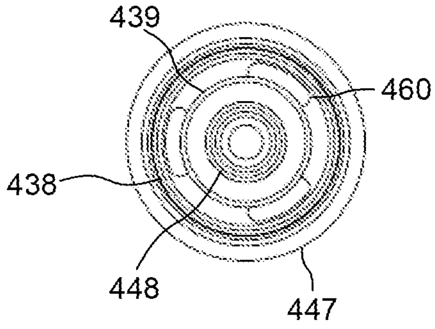

FIGS. 58A to 58B illustrate perspective views of the piston assembly 434, whereas FIGS. 59A and 59B illustrate top and bottom views of the piston assembly 434.

The Pin Door Closure Control System

FIGS. 60A to 61B illustrate an example hinge pin system 500 that is configured to replaces a hinge pin in a door hinge and that controls the slamming of a door.

Figure 60A:
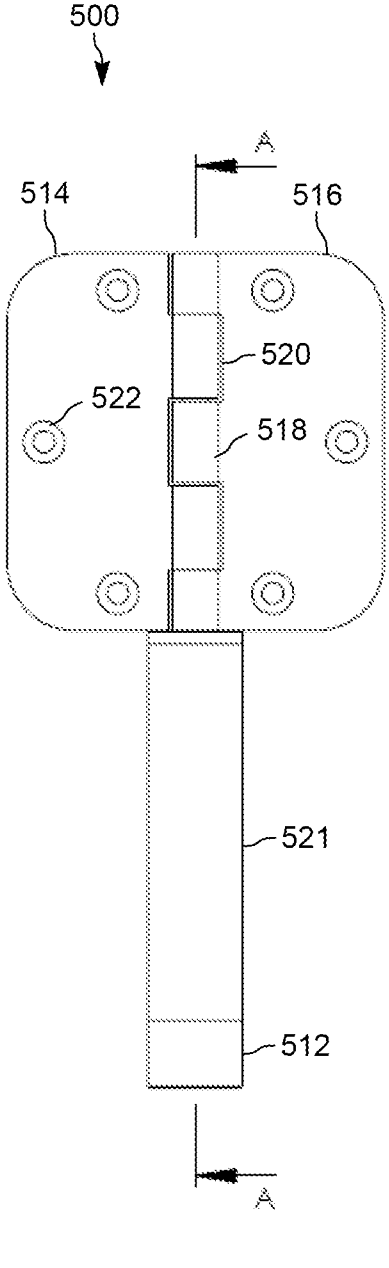
FIG. 60A to 61B illustrate multiple views of an example hinge system incorporated in a hinge according to an embodiment of the present technology.
Figure 60B:
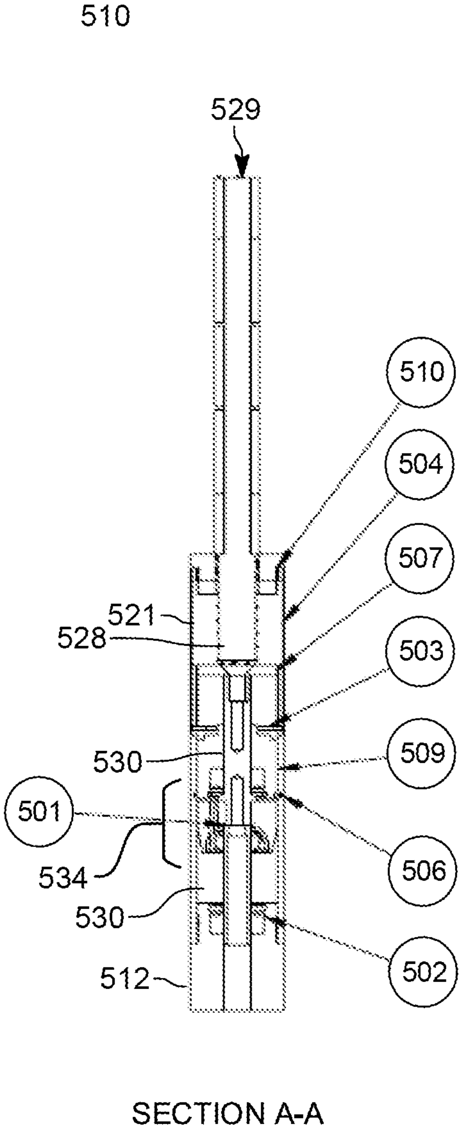

As shown in FIGS. 60A and 60B, first and second leaves 514, 516 include first and second hinge knuckles 520 and 518, respectively, through which a pin 529 may be inserted. A fastener is configured to secure the pin system 500 in place once inserted through the first and second hinge knuckles 520 and 518. The leaves 514 and/or 516 may include one or more fasteners or screw holes 522 to facilitate securing the hinge to a door.

The hinge pin system 500 includes a piston assembly 534 which includes a rebound shim and a piston head, similar to piston assemblies disclosed herein with respect to the examples illustrated in FIGS. 1-26 and 47-59B. The piston assembly 534 is configured to control movement of the pin system 500 by applying force against an STF within a chamber 530 (e.g., within a body or chamber housing 521).

An adjustable cap 512 is rotatable such that the position of the shim relative to the piston head changes, changing an amount of overlap between shim slots and piston slots. As the amount of overlap between shim slots and piston slots changes, the size of a channel through which the STF may flow changes, thereby modifying the resistance the piston assembly 534 meets when pressing against the STF.

In some examples, the piston assembly 534 is at rest within the chamber 530 when leaves 514 and 516 are in contact (e.g., when a corresponding door is closed). A screw 528 is connected to the pin 529 and arranged within a nut 504. The nut 504 is coupled to a coupling 507, which is coupled to bushing 509 via a lower chamber cam 503. A snap ring bore 506 is arranged within the housing 521. An end bushing 502 maintains a fluid seal for the cap 512 as the plunger 501 moves within the chamber 530.

In examples, the pin 529 (and the screw 528) are in a fixed orientation with respect to leaf 514, and an end plug 510 is fixed relative to the leaf 516. Thus, the pin 529 and the screw 528 turn, but maintain their vertical position during rotation of leaf 514. Relative rotation between leaves 514 and 516 therefore causes the pin 529 and the screw 528 to turn. As the screw 528 rotates within nut 504, the nut 504 is forced to turn and therefore moves vertically, such as toward the cap 512 as the door closes (e.g. as the leaves 514 and 516 come together) and away from the cap 512 as the door opens (e.g. as the leaves 514 and 516 spread apart). In an example with the door closing, the nut 504 moves toward the cap 512, forcing the chamber cam 503 and the bushing 509 toward the cap 512 as well. This movement forces the piston assembly 534 into the chamber 530, where it meets resistance from an STF therein. The piston assembly 354 is similar to those in the embodiments discussed above and can be adjusted like those piston assemblies and engage the STF in a manner similar to those piston assemblies.

Figure 61A:
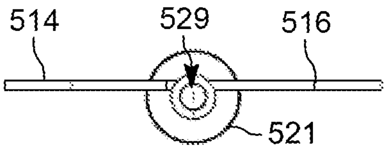
Figure 60C:
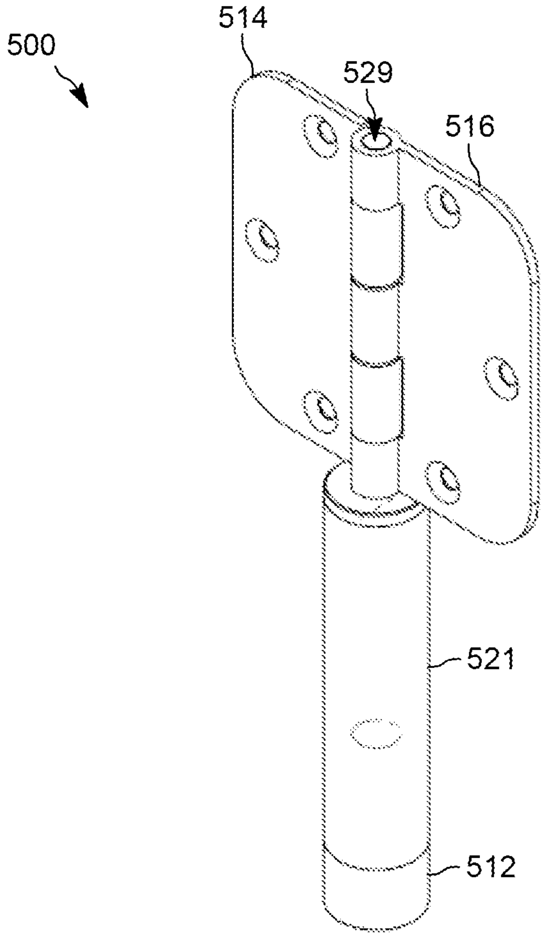
Figure 61B:
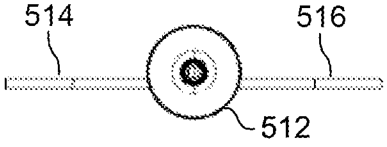

FIG. 60C provides a perspective view of the pin system 500. FIGS. 61A and 61B provide top and end views of the system 500, respectively.

Thus, as explained herein, the disclosed technology provides a way to control movement of a device, such as a door. Advantageously, it can protect devices from other devices slamming into them and thus help prevent damage to devices, harm to people near the devices, and/or loud noises created by devices contacting each other.

It is to be understood that the disclosed technology is not limited in its application to the details of construction and the arrangement of the components set forth in the description or illustrated in the drawings. The technology is capable of other embodiments and of being practiced or being carried out in various ways. Also, it is to be understood that the phraseology and terminology used herein are for the purpose of description and should not be regarded as limiting. The use of “including” and “comprising” and variations thereof is meant to encompass the items listed thereafter and equivalents thereof as well as additional items and equivalents thereof.

While various spatial and directional terms, such as top, bottom, lower, mid, lateral, horizontal, vertical, front and the like may be used to describe embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present technology. It is understood that the technology disclosed and defined herein extends to all alternative combinations of two or more of the individual features mentioned or evident from the text and/or drawings. All of these different combinations constitute various alternative aspects of the present technology.

The invention claimed is:

1. A device for controlling the motion of a door, comprising:
- a hinge including a first hinge leaf and a second hinge leaf;
- a first spring within a first chamber of the first hinge leaf and connected to a plunger; and
- a second spring within a second chamber of the second hinge leaf and configured to contact a surface of the plunger opposite the first spring, wherein, when one of the first hinge leaf and second hinge leaf is rotated, a screw connected to the plunger rotates such that the plunger moves vertically within the first hinge leaf to vertically compress one of the first or second spring and vertically extend the other of the first or second spring;

a plunger bushing connected to the screw by a pin, the plunger bushing configured to maintain a concentric position of the plunger such that the plunger travels along a central axis while moving with the screw and wherein the pin travels within one or more slots of the plunger bushing during vertical movement of the plunger.

2. The device of claim 1, wherein the first spring is configured to drive the hinge to close by applying a force against the plunger.

3. The device of claim 2, wherein the second spring is configured to resist closure of the hinge by opposing the force against the plunger by the first spring.

4. The device of claim 1, further comprising a cap configured to rotate with respect to the screw thereby adjusting an amount of resistance experienced by the plunger from the first spring.

5. The device of claim 4, wherein the cap includes a cap screw extending into a shaft within the screw.

6. The device of claim 5, wherein rotation of the cap drives the cap screw into or out from the shaft, changing the amount of linear movement of the plunger when the first hinge leaf rotates relative to the second hinge leaf, and thus how far the door can swing open.

7. The device of claim 1, wherein the plunger bushing is at least partially arranged within the second hinge leaf and configured to substantially maintain a vertical position within the second hinge during rotation of the screw.

8. The device of claim 1, further comprising a washer platform located in the second chamber and configured to be raised or lowered to change a distance the second spring can be compressed within the second chamber.

9. The device of claim 8, wherein the washer platform is configured to be accessed at an end of the second chamber opposite the plunger, such that rotation of the washer platform raises or lowers the washer platform with respect to the plunger.

10. The device of claim 1, wherein the first spring is compressed or extended within the first chamber as a distance between the plunger bushing and the plunger changes during vertical movement of the screw.

11. A device for controlling the motion of a door, comprising:

a first spring within a first chamber of a hinge and connected to a piston cartridge;

a plunger connected to the piston cartridge;

a screw connected to the piston cartridge and extending through a threaded portion of a nut, the nut fixed to, and configured to rotate with, a first hinge leaf of the hinge; and a second spring within a second chamber of the hinge and configured to contact the plunger opposite the first spring, wherein, when the first hinge leaf is rotated, the nut rotates with the first hinge leaf, which causes the screw to rotate and move vertically, causing the piston cartridge and the plunger to move vertically within the hinge to vertically compress one of the first or second spring and vertically extend the other of the first or second spring.

12. A device for controlling the motion of a door, comprising:

a hinge including a first hinge leaf and a second hinge leaf;

a first spring within a first chamber of the first hinge leaf and connected to a plunger; and a second spring within a second chamber of the second hinge leaf and configured to contact a surface of the plunger opposite the first spring, and a washer platform located in the second chamber and configured to be raised or lowered to change a distance the second spring can be compressed within the second chamber;

wherein, when one of the first hinge leaf and second hinge leaf is rotated, a screw connected to the plunger rotates such that the plunger moves vertically within the first hinge leaf to vertically compress one of the first or second spring and vertically extend the other of the first or second spring.

13. The device of claim 12, wherein the washer platform is configured to be accessed at an end of the second chamber opposite the plunger, such that rotation of the washer platform raises or lowers the washer platform with respect to the plunger.

14. The device of claim 12, further comprising a nut fixed to, and configured to rotate with, the first hinge leaf, wherein the screw extends through a threaded portion of the nut, such that rotation of the first hinge leaf causes the screw to rotate.

15. The device of claim 12, further comprising a cap configured to rotate with respect to the screw thereby adjusting an amount of resistance experienced by the plunger from the first spring.

16. The device of claim 15, wherein the cap includes a cap screw extending into a shaft within the screw and wherein rotation of the cap drives the cap screw into or out from the shaft, changing the amount of linear movement of the plunger when the first hinge leaf rotates relative to the second hinge leaf.

17. A device for controlling the motion of a door, comprising:

a hinge including a first hinge leaf and a second hinge leaf;

a first spring within a first chamber of the first hinge leaf and connected to a plunger; and a second spring within a second chamber of the second hinge leaf and configured to contact a surface of the plunger opposite the first spring, wherein, when one of the first hinge leaf and second hinge leaf is rotated, a screw connected to the plunger rotates such that the plunger moves vertically within the first hinge leaf to vertically compress one of the first or second spring and vertically extend the other of the first or second spring;

a plunger bushing connected to the screw by a pin, the plunger bushing configured to maintain a concentric position of the plunger such that the plunger travels along a central axis while moving with the screw and wherein the first spring is compressed or extended within the first chamber as a distance between the plunger bushing and the plunger changes during vertical movement of the screw.

18. The device of claim 17, wherein the plunger bushing is configured to substantially maintain a vertical position within the second hinge leaf during rotation of the screw.

19. The device of claim 17, further comprising a nut fixed to, and configured to rotate with, the first hinge leaf, wherein the screw extends through a threaded portion of the nut, such that rotation of the first hinge leaf causes the screw to rotate.

20. The device of claim 17, further comprising a cap configured to rotate with respect to the screw thereby adjusting an amount of resistance experienced by the plunger from the first spring.

21. The device of claim 20, wherein the cap includes a cap screw extending into a shaft within the screw and wherein rotation of the cap drives the cap screw into or out from the shaft, changing the amount of linear movement of the plunger when the first hinge leaf rotates relative to the second hinge leaf.

* * * * *